US010440174B2

(12) United States Patent
Boule et al.

(10) Patent No.: US 10,440,174 B2
(45) Date of Patent: Oct. 8, 2019

(54) MANAGEMENT OF MOVEMENT STATES OF AN ELECTRONIC DEVICE USING COMMUNICATIONS CIRCUITRY DATA

(71) Applicant: Apple Inc., Cupertino, CA (US)

(72) Inventors: Andre M. Boule, San Jose, CA (US); Andrew M. Wadycki, San Mateo, CA (US); Bor-rong Chen, Saratoga, CA (US); Emily C. Schubert, Los Gatos, CA (US); Srinivasan Nimmala, San Jose, CA (US); Sunny K. Chow, Santa Clara, CA (US); Gunes Dervisoglu, Santa Clara, CA (US); Venkateswara Rao Manepalli, San Jose, CA (US); Vijay Kumar Ramamurthi, Milpitas, CA (US); Anh N. Phan, Milpitas, CA (US); Maulik V. Choksi, Cupertino, CA (US); John D. Blackwell, San Francisco, CA (US); Xiao Xiao, Orinda, CA (US); Xiaoyuan Tu, Sunnyvale, CA (US); Hung A. Pham, Oakland, CA (US); Richard B. Warren, Redwood City, CA (US); Ronald K. Huang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/981,339

(22) Filed: May 16, 2018

(65) Prior Publication Data

US 2018/0338033 A1 Nov. 22, 2018

Related U.S. Application Data

(60) Provisional application No. 62/507,200, filed on May 16, 2017.

(51) Int. Cl.
*G08B 21/00* (2006.01)
*H04M 1/725* (2006.01)
(Continued)

(52) U.S. Cl.
CPC ......... *H04M 1/72577* (2013.01); *G01S 19/52* (2013.01); *H04M 1/663* (2013.01);
(Continued)

(58) Field of Classification Search
CPC ............ H04M 1/72577; H04M 1/663; H04M 1/72569; H04M 1/72566; H04M 1/72572; H04M 2250/12; G01S 19/52; H04W 84/12
(Continued)

(56) References Cited

U.S. PATENT DOCUMENTS 7,898,428 B2 3/2011 Dietz et al.
8,874,162 B2 * 10/2014 Schrader ............... H04W 12/08
455/550.1
(Continued)

FOREIGN PATENT DOCUMENTS

EP 1578094 A2 9/2005

*Primary Examiner* — Zhen Y Wu
(74) *Attorney, Agent, or Firm* — Van Court & Aldridge LLP

(57) ABSTRACT

Systems, methods, and computer-readable media for managing or classifying movement states of an electronic device are provided that may utilize communications circuitry data from one or more communications circuitries when determining a current or future movement state of an electronic device.

20 Claims, 6 Drawing Sheets

(51) Int. Cl.
*G01S 19/52* (2010.01)
*H04W 84/12* (2009.01)
*H04M 1/663* (2006.01)

(52) U.S. Cl.
CPC ....... *H04M 1/72569* (2013.01); *H04W 84/12* (2013.01); *H04M 1/72566* (2013.01); *H04M 1/72572* (2013.01); *H04M 2250/12* (2013.01)

(58) Field of Classification Search
USPC ........................................................ 340/670
See application file for complete search history.

(56) References Cited

U.S. PATENT DOCUMENTS

| | | | |
|---|---|---|---|
| 9,554,247 B2 | 1/2017 | Jones et al. | |
| 9,571,631 B1* | 2/2017 | Rownin | H04W 4/046 |
| 9,609,621 B2 | 3/2017 | Osann, Jr. | |
| 2012/0250517 A1* | 10/2012 | Saarimaki | H04M 1/72569 370/241 |
| 2015/0065107 A1 | 3/2015 | Dave et al. | |
| 2015/0156031 A1* | 6/2015 | Fadell | H04L 12/2816 700/276 |
| 2015/0256999 A1* | 9/2015 | Doorandish | H04W 4/90 455/419 |
| 2015/0350822 A1 | 12/2015 | Xiao et al. | |
| 2016/0129913 A1* | 5/2016 | Boesen | B60W 40/09 705/4 |
| 2016/0270025 A1* | 9/2016 | Osann, Jr. | H04W 64/006 |
| 2016/0373905 A1 | 12/2016 | Warr | |
| 2017/0201619 A1* | 7/2017 | Cohen | H04M 1/6075 |
| 2017/0295277 A1* | 10/2017 | Figgers | H04M 1/72577 |
| 2017/0358208 A1 | 12/2017 | Kazemi et al. | |
| 2018/0188925 A1* | 7/2018 | Na | G04G 9/0064 |
| 2018/0288215 A1* | 10/2018 | Rahman | H04M 1/72577 |

* cited by examiner

| 502 — DETERMINE THE AVAILABILITY OF ANY NEW DATA FROM EACH ONE OF A MOTION SENSOR CIRCUITRY, A SHORT RANGE COMMUNICATIONS CIRCUITRY, A SATELLITE NAVIGATION COMMUNICATIONS CIRCUITRY, A WIRELESS LOCAL AREA NETWORK ("WLAN") COMMUNICATIONS CIRCUITRY, AND A BASEBAND COMMUNICATIONS CIRCUITRY OF AN ELECTRONIC DEVICE

504 — ACTIVATE A DO-NOT-DISTURB MODE ON THE ELECTRONIC DEVICE WHEN ANY ONE OF THE FOLLOWING IS TRUE: NEW SHORT RANGE DATA IS DETERMINED TO BE AVAILABLE FROM THE SHORT RANGE COMMUNICATIONS CIRCUITRY THAT IS INDICATIVE OF THE ELECTRONIC DEVICE BEING COMMUNICATIVELY COUPLED TO A COMPUTER OF A VEHICLE; NEW SATELLITE NAVIGATION DATA IS DETERMINED TO BE AVAILABLE FROM THE SATELLITE NAVIGATION COMMUNICATIONS CIRCUITRY THAT IS INDICATIVE OF THE ELECTRONIC DEVICE MOVING FASTER THAN A FIRST SPEED THRESHOLD AND NO NEW MOTION SENSOR DATA IS DETERMINED TO BE AVAILABLE FROM THE MOTION SENSOR CIRCUITRY THAT IS INDICATIVE OF ANY PEDESTRIAN MOTION CLASS AND NO NEW SHORT RANGE DATA IS DETERMINED TO BE AVAILABLE FROM THE SHORT RANGE COMMUNICATIONS CIRCUITRY THAT IS INDICATIVE OF THE ELECTRONIC DEVICE BEING COMMUNICATIVELY COUPLED TO A COMPUTER OF A VEHICLE; NEW SATELLITE NAVIGATION DATA IS DETERMINED TO BE AVAILABLE FROM THE SATELLITE NAVIGATION COMMUNICATIONS CIRCUITRY THAT IS INDICATIVE OF THE ELECTRONIC DEVICE MOVING FASTER THAN A SECOND SPEED THRESHOLD AND NO NEW MOTION SENSOR DATA IS DETERMINED TO BE AVAILABLE FROM THE MOTION SENSOR CIRCUITRY THAT IS INDICATIVE OF ANY CYCLING MOTION CLASS OR ANY PEDESTRIAN MOTION CLASS AND NO NEW SHORT RANGE DATA IS DETERMINED TO BE AVAILABLE FROM THE SHORT RANGE COMMUNICATIONS CIRCUITRY THAT IS INDICATIVE OF THE ELECTRONIC DEVICE BEING COMMUNICATIVELY COUPLED TO A COMPUTER OF A VEHICLE; NEW WLAN DATA IS DETERMINED TO BE AVAILABLE FROM THE WLAN COMMUNICATIONS CIRCUITRY THAT IS INDICATIVE OF THE ELECTRONIC DEVICE MOVING FASTER THAN A THIRD SPEED THRESHOLD AND NO NEW MOTION SENSOR DATA IS DETERMINED TO BE AVAILABLE FROM THE MOTION SENSOR CIRCUITRY THAT IS INDICATIVE OF ANY PEDESTRIAN MOTION CLASS WITHIN A PERIOD OF TIME ASSOCIATED WITH THE NEW WLAN DATA AND NO NEW SHORT RANGE DATA IS DETERMINED TO BE AVAILABLE FROM THE SHORT RANGE COMMUNICATIONS CIRCUITRY THAT IS INDICATIVE OF THE ELECTRONIC DEVICE BEING COMMUNICATIVELY COUPLED TO A COMPUTER OF A VEHICLE AND NO NEW SATELLITE NAVIGATION DATA IS DETERMINED TO BE AVAILABLE FROM THE SATELLITE NAVIGATION COMMUNICATIONS CIRCUITRY; NEW BASEBAND DATA IS DETERMINED TO BE AVAILABLE FROM THE BASEBAND COMMUNICATIONS CIRCUITRY THAT IS INDICATIVE OF THE ELECTRONIC DEVICE MOVING FASTER THAN A FOURTH SPEED THRESHOLD AND NO NEW MOTION SENSOR DATA IS DETERMINED TO BE AVAILABLE FROM THE MOTION SENSOR CIRCUITRY THAT IS INDICATIVE OF ANY PEDESTRIAN MOTION CLASS WITHIN A PERIOD OF TIME ASSOCIATED WITH THE NEW BASEBAND DATA AND NO NEW SHORT RANGE DATA IS DETERMINED TO BE AVAILABLE FROM THE SHORT RANGE COMMUNICATIONS CIRCUITRY THAT IS INDICATIVE OF THE ELECTRONIC DEVICE BEING COMMUNICATIVELY COUPLED TO A COMPUTER OF A VEHICLE AND NO NEW SATELLITE NAVIGATION DATA IS DETERMINED TO BE AVAILABLE FROM THE SATELLITE NAVIGATION COMMUNICATIONS CIRCUITRY AND NO NEW WLAN DATA IS DETERMINED TO BE AVAILABLE FROM THE WLAN COMMUNICATIONS CIRCUITRY; AND NEW MOTION SENSOR DATA IS DETERMINED TO BE AVAILABLE FROM THE MOTION SENSOR CIRCUITRY THAT IS INDICATIVE OF A VEHICULAR DRIVING MOTION CLASS AND NO NEW SHORT RANGE DATA IS DETERMINED TO BE AVAILABLE FROM THE SHORT RANGE COMMUNICATIONS CIRCUITRY THAT IS INDICATIVE OF THE DEVICE BEING COMMUNICATIVELY COUPLED TO A COMPUTER OF A VEHICLE AND NO NEW SATELLITE NAVIGATION DATA IS DETERMINED TO BE AVAILABLE FROM THE SATELLITE NAVIGATION COMMUNICATIONS CIRCUITRY AND NO NEW WLAN DATA IS DETERMINED TO BE AVAILABLE FROM THE WLAN COMMUNICATIONS CIRCUITRY AND NO NEW BASEBAND DATA IS DETERMINED TO BE AVAILABLE FROM THE BASEBAND COMMUNICATIONS CIRCUITRY

MANAGEMENT OF MOVEMENT STATES OF AN ELECTRONIC DEVICE USING COMMUNICATIONS CIRCUITRY DATA

CROSS-REFERENCE TO RELATED APPLICATION(S)

This application claims the benefit of prior filed U.S. Provisional Patent Application No. 62/507,200, filed May 16, 2017, which is hereby incorporated by reference herein in its entirety.

TECHNICAL FIELD

This disclosure relates to the management of movement states of an electronic device and, more particularly, to the management of movement states of an electronic device using communications circuitry data.

BACKGROUND OF THE DISCLOSURE

A portable electronic device (e.g., a cellular telephone) may be provided with one or more motion-sensing components (e.g., accelerometers, gyroscopes, etc.) that may be utilized for determining a movement state of the electronic device (e.g., whether the device is being carried by a user that is walking, running, or cycling). Often, however, the data provided by such motion-sensing components is insufficient on its own to enable a reliable determination of a device movement state.

SUMMARY OF THE DISCLOSURE

This document describes systems, methods, and computer-readable media for managing movement states of an electronic device using communications circuitry data.

As an example, a method may be provided for managing a do-not-disturb mode on an electronic device that includes a wireless local area network component, an application processor, and an output component. The method may include, while the application processor is in a sleep mode, periodically scanning for any available networks with the wireless local area network component, recording in an array with the wireless local area network component, for each network detected during the scanning, a media access control address of the network and an associated timestamp indicative of when the network was detected, and detecting an event operative to wake up the application processor from the sleep mode. The method may also include, in response to the detecting, waking up the application processor from the sleep mode, and, after the waking up, processing the event with the application processor, processing each media access control address and associated timestamp of the array with the application processor to determine a speed of the electronic device, when the determined speed is below a threshold, providing with the output component an output based on the processed event, and, when the determined speed is above a threshold, activating the do-not-disturb mode on the electronic device to suppress from the output component any output based on the processed event.

As another example, a method may be provided for managing a do-not-disturb mode on an electronic device that includes motion sensor circuitry, short range communications circuitry, satellite navigation communications circuitry, wireless local area network ("WLAN") communications circuitry, and baseband communications circuitry. The method may include determining the availability of any new data from each one of the motion sensor circuitry, the short range communications circuitry, the satellite navigation communications circuitry, the WLAN communications circuitry, and the baseband communications circuitry. The method may also include activating the do-not-disturb mode on the electronic device when any one of the following is true: new short range data is determined to be available from the short range communications circuitry that is indicative of the electronic device being communicatively coupled to a computer of a vehicle, new satellite navigation data is determined to be available from the satellite navigation communications circuitry that is indicative of the electronic device moving faster than a first speed threshold and no new motion sensor data is determined to be available from the motion sensor circuitry that is indicative of any pedestrian motion class and no new short range data is determined to be available from the short range communications circuitry that is indicative of the electronic device being communicatively coupled to a computer of a vehicle, new satellite navigation data is determined to be available from the satellite navigation communications circuitry that is indicative of the electronic device moving faster than a second speed threshold and no new motion sensor data is determined to be available from the motion sensor circuitry that is indicative of any cycling motion class or any pedestrian motion class and no new short range data is determined to be available from the short range communications circuitry that is indicative of the electronic device being communicatively coupled to a computer of a vehicle, new WLAN data is determined to be available from the WLAN communications circuitry that is indicative of the electronic device moving faster than a third speed threshold and no new motion sensor data is determined to be available from the motion sensor circuitry that is indicative of any pedestrian motion class within a period of time associated with the new WLAN data and no new short range data is determined to be available from the short range communications circuitry that is indicative of the electronic device being communicatively coupled to a computer of a vehicle and no new satellite navigation data is determined to be available from the satellite navigation communications circuitry, new baseband data is determined to be available from the baseband communications circuitry that is indicative of the electronic device moving faster than a fourth speed threshold and no new motion sensor data is determined to be available from the motion sensor circuitry that is indicative of any pedestrian motion class within a period of time associated with the new baseband data and no new short range data is determined to be available from the short range communications circuitry that is indicative of the electronic device being communicatively coupled to a computer of a vehicle and no new satellite navigation data is determined to be available from the satellite navigation communications circuitry and no new WLAN data is determined to be available from the WLAN communications circuitry, and new motion sensor data is determined to be available from the motion sensor circuitry that is indicative of a vehicular driving motion class and no new short range data is determined to be available from the short range communications circuitry that is indicative of the device being communicatively coupled to a computer of a vehicle and no new satellite navigation data is determined to be available from the satellite navigation communications circuitry and no new WLAN data is determined to be available from the WLAN communications circuitry and no new baseband data is determined to be available from the baseband communications circuitry.

As yet another example, a method may be provided for managing a do-not-disturb ("DND") mode on an electronic device. The method may include, while the DND mode is enabled, determining the availability of new motion data from motion sensor circuitry of the electronic device, and exiting the DND mode when any one of the following is true: new motion data is determined to be available that is indicative of any pedestrian motion class, new motion data is determined to be available that is indicative of 2 minutes of static preceded by a dismount event in the last 4 minutes, and new location data is determined to be available that is indicative of the electronic device being at a frequently visited location for a time above a threshold amount of time.

This Summary is provided only to present some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIGS. 4-6 are flowcharts of illustrative processes for managing an electronic device.

DETAILED DESCRIPTION OF THE DISCLOSURE

Systems, methods, and computer-readable media may be provided to manage movement states of an electronic device (e.g., to determine or classify a movement state of an electronic device and to manage or change a mode of operation of the electronic device based on the determined movement state). In addition to using motion sensor data that may be provided by at least one motion sensor component of at least one type of motion sensor circuitry, a movement management system may also use one or more various other types of data accessible to the electronic device in order to determine the current movement state of the device (e.g., to determine whether the device is currently stationary or in motion of some sort (e.g., walking, running, cycling, driving, etc.)). Such various other types of data may be provided by any suitable communications circuitry of the electronic device that may be configured to enable the electronic device to communicate data with a remote entity using any suitable communications protocol, such as short range wireless communications circuitry, satellite navigation communications circuitry, wireless local area network communications circuitry, baseband communications circuitry, and the like. Motion sensor data may be analyzed in combination with communications circuitry data from one or more available communications circuitries in order to make an effective and efficient movement state determination. In response to determining the current movement state of the device, the movement management system may apply at least one movement-based mode of operation to an element (e.g., a component or application) of the device based on the determined current movement state.

Figure 1:
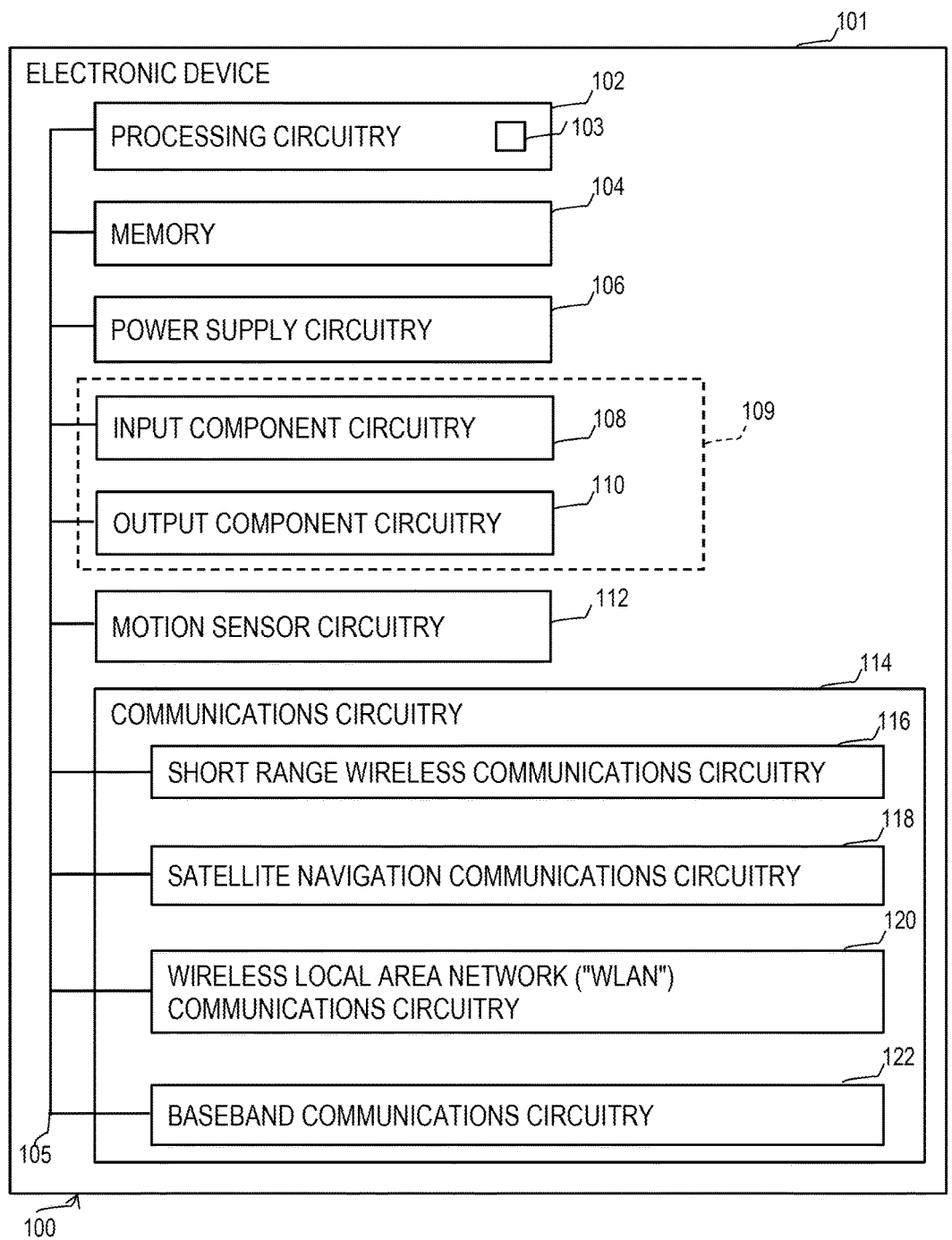
FIG. 1 is a schematic view of an illustrative electronic device for managing movement states.

FIG. 1 is a schematic view of an illustrative electronic device 100 for managing movement states in accordance with some embodiments. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to managing movement states) and, in other embodiments, electronic device 100 may perform multiple functions (e.g., a device that manages movement states, plays music, and receives and transmits telephone calls).

Electronic device 100 may be any portable, mobile, hand-held, wearable, implantable, or miniature electronic device that may be configured to manage movement states of device 100 wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include processing circuitry (or processor) 102, memory 104, power supply circuitry 106, input component circuitry 108, output component circuitry 110, motion sensor circuitry 112, and communications circuitry 114, which may include any suitable type(s) of communications circuitry, including, but not limited to, short range wireless communications circuitry 116, satellite navigation communications circuitry 118, wireless local area network ("WLAN") communications circuitry 120, and baseband communications circuitry 122. Electronic device 100 may also include a bus 105 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including, for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any other suitable data, or any combination thereof.

Power supply circuitry 106 can include any suitable circuitry for receiving and/or generating power, and for providing such power to one or more of the other components of electronic device 100. For example, power supply circuitry 106 can be coupled to a power grid (e.g., when device 100 is not acting as a portable device or when a battery of the device is being charged at an electrical outlet with power generated by an electrical power plant). As another example, power supply circuitry 106 can be configured to generate power from a natural source (e.g., solar power using solar cells). As another example, power supply circuitry 106 can include one or more batteries for providing power (e.g., when device 100 is acting as a portable device). For example, power supply circuitry 106 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply circuitry 106 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply circuitry 106 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 108 may be provided to permit a user or environment to interact or interface with device 100. For example, input component circuitry 108 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, biometric sensor (e.g., a fingerprint reader or other feature recognition sensor, which may operate in conjunction with a feature-processing application that may be accessible to electronic device 100 for authenticating a user), line-in connector for data and/or power, and combinations thereof. Each input component 108 can be configured to provide one or more dedicated control functions for making selections or issuing commands associated with operating device 100.

Electronic device 100 may also include one or more output components 110 that may present information (e.g., graphical, audible, and/or tactile information) to a user of device 100. For example, output component circuitry 110 of electronic device 100 may take various forms, including, but not limited to, audio speakers, headphones, line-out connectors for data and/or power, visual displays, infrared ports, tactile/haptic outputs (e.g., rumblers, vibrators, etc.), and combinations thereof. As a particular example, electronic device 100 may include a display output component as output component 110, where such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O circuitry or I/O interface (e.g., input component 108 and output component 110 as I/O component or I/O interface 109). For example, input component 108 and output component 110 may sometimes be a single I/O component 109, such as a touch screen, that may receive input information through a user's touch of a display screen and that may also provide visual information to a user via that same display screen.

Motion sensor circuitry 112, which may be a particular type of input component circuitry, may include any suitable motion sensor or any suitable combination of motion sensors operative to detect movements of electronic device 100 (e.g., with respect to gravity, space, etc.). For example, motion sensor circuitry 112 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, motion sensor circuitry 112 may include one or more single-axis or two-axis acceleration motion sensors that may be operative to detect linear acceleration only along each of the x- or left/right direction and the y- or up/down direction, or along any other pair of directions. In some embodiments, motion sensor circuitry 112 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). In some embodiments, motion sensor circuitry 112 may be operative to directly or indirectly detect rotation, rotational movement, angular displacement, tilt, position, orientation, motion along a non-linear (e.g., arcuate) path, or any other non-linear motions. Additionally or alternatively, motion sensor circuitry 112 may include one or more angular rate, inertial, and/or gyro-motion sensors or gyroscopes for detecting rotational movement. For example, motion sensor circuitry 112 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by motion sensor circuitry 112 for detecting motion on device 100, such as any suitable pressure sensors, altimeters, compasses, or the like. Using motion sensor circuitry 112, electronic device 100 may be configured to determine a velocity, acceleration, orientation, and/or any other suitable motion attribute of electronic device 100.

Communications circuitry 114 may be provided to allow device 100 to communicate with one or more other electronic devices or servers using any suitable communications protocol. For example, communications circuitry 114 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications circuitry 114 may also include or be electrically coupled to any suitable transceiver circuitry that can enable device 100 to be communicatively coupled to another device (e.g., a host computer or an accessory device) and communicate with that other device wirelessly, or via a wired connection (e.g., using a connector port). Communications circuitry 114 may be configured to determine a geographical position of electronic device 100. For example, communications circuitry 114 may utilize the global positioning system ("GPS") or a regional or site-wide positioning system that may use cell tower positioning technology or Wi-Fi™ technology.

As shown, in some embodiments, communications circuitry 114 may include one, some, or each of short range wireless communications circuitry 116, satellite navigation communications circuitry 118, wireless local area network ("WLAN") communications circuitry 120, and baseband communications circuitry 122. Short range wireless communications circuitry 116 may include any suitable components, modules, circuitries, antennas, processors, memory, data structures, firmware, software, and/or hardware that may be configured to communicate (e.g., receive and/or transmit) and process or otherwise handle data according to any suitable short range wireless communications protocol (e.g., for communicated signal travel from a few centimeters to several meters), including, but not limited to, Bluetooth™, Bluetooth™ Low Energy ("BLE"), infrared, ultra-wideband, ZigBee™ (e.g., an 802.15.4 protocol), near field communication (e.g., any suitable proximity-based communication mechanism that may enable contact-less and close range communication at relatively low data rates (e.g., 424 kbps), and may comply with any suitable standards, such as ISO/IEC 7816, ISO/IEC 18092, ECMA-340, ISO/TEC 21481, ECMA-352, ISO 14443, and/or ISO 15693, and/or close range communication at relatively high data rates (e.g., 560 Mbps), and may comply with any suitable standards, such as the TransferJet™ protocol), and/or the like (e.g., for communication with a short range wireless communications component 16 of a computer 10 of a vehicle 11 of system 1 of FIG. 2). Satellite navigation communications circuitry 118 may include any suitable components, modules, circuitries, antennas, processors, memory, data structures, firmware, software, and/or hardware that may be configured to communicate (e.g., receive and/or transmit) and process or otherwise handle data according to any suitable satellite radio navigation system communications protocol (e.g., for communicated signal travel to regional and/or global navigation satellite systems), including, but not limited to, Global Positioning System ("GPS") protocols, whereby GPS satellites may continuously transmit their current time and position to satellite navigation communications circuitry 118, which may monitor multiple satellites and solve equations to determine the precise position or location of satellite navigation communications circuitry 118 (e.g., for communication with one or more of satellites 18a, 18b, and 18c of system 1 of FIG. 2). Wireless local area network ("WLAN") communications circuitry 120 may include any suitable components, modules, circuitries, antennas, processors, memory, data structures, firmware, software, and/or hardware that may be configured to communicate (e.g., receive and/or transmit) and process or otherwise handle data according to any suitable medium range wireless communications protocol (e.g., for communicated signal travel up to 100 meters or so), including, but not limited to, Wi-Fi™ (e.g., an 802.11 protocol) (e.g., for communication with one or more of wireless access points ("WAPs") 20a, 20b, and 20c of system 1 of FIG. 2). Baseband communications circuitry 122 may include any suitable components, modules, circuitries, antennas, processors, memory, data structures, firmware, software, and/or hardware that may be configured to communicate (e.g., receive and/or transmit) and process or otherwise handle data according to any suitable long range wireless communications protocol (e.g., for communicated signal travel even greater than 100 meters or so), including, but not limited to, wide-area wireless communication or any suitable cellular network technologies, such as wireless metropolitan area network ("WiMax" or "WMAN"), long-term evolution ("LTE"), Global System for Mobile Communications ("GSM"), GSM plus Enhanced Data rates for GSM Evolution ("EDGE"), Code Division Multiple Access ("CDMA"), CDMA 2000, Orthogonal Frequency-Division Multiple Access ("OFDMA"), high speed packet access ("HSPA"), multi-band, universal mobile telecommunications system ("UMTS"), cellular digital packet data ("CDPD"), advanced mobile phone system ("AMPS"), or the like that may communicate with ground-based cellular towers or any other suitable cellular entity of any suitable cellular network (e.g., for communication with one or more of base stations 22a, 22b, 22c, and 22d of system 1 of FIG. 2). In some embodiments, one or more suitable components, modules, circuitries, antennas, processors, memory, data structures, firmware, software, and/or hardware of one of short range wireless communications circuitry 116, satellite navigation communications circuitry 118, WLAN communications circuitry 120, and baseband communications circuitry 122 may be the same as (e.g., shared) one or more suitable components, modules, circuitries, antennas, processors, memory, data structures, firmware, software, and/or hardware of at least one other one of short range wireless communications circuitry 116, satellite navigation communications circuitry 118, WLAN communications circuitry 120, and baseband communications circuitry 122.

Processing circuitry 102 of electronic device 100 may include any processing circuitry that may be operative to control the operations and performance of one or more components of electronic device 100. For example, processor 102 may receive input signals from any input component circuitry 108 and/or motion sensor circuitry 112 and/or communications circuitry 114, and/or drive output signals through any output component circuitry 110 and/or any communications circuitry 114. As shown in FIG. 1, processor 102 may be used to run one or more applications, such as an application 103. Application 103 may include, but is not limited to, one or more operating system applications, firmware applications, media playback applications, media editing applications, communications applications, pass applications, calendar applications, state determination applications, biometric feature-processing applications, or any other suitable applications. For example, processor 102 may load application 103 as a user interface program to determine how instructions or data received via an input component circuitry 108 or other circuitry of device 100 may manipulate the one or more ways in which information may be stored and/or provided to the user via an output component circuitry 110 or other suitable circuitry of device 100. Any application 103 may be accessed by any processing circuitry 102 from any suitable source, such as from memory 104 (e.g., via bus 105) or from another device or server (e.g., via communications circuitry 114). Processor 102 may include a single processor or multiple processors. For example, processor 102 may include at least one "general purpose" microprocessor, a combination of general and special purpose microprocessors, instruction set processors, graphics processors, video processors, communications processors, motion processors, application processors, and/or related chips sets, and/or special purpose microprocessors. Processor 102 also may include on board memory for caching purposes.

Any communications circuitry (e.g., one or more of communications circuitries 116, 118, 120, and 122) may share portions of processor 102 and/or may include its own processor (not shown) that may exist as a separate component, may be integrated into another chipset, or may be integrated with processor 102, for example, as part of a system on a chip ("SoC"), and that may be used to run one or more applications, such as a communications circuitry data processor, which may help dictate the functionality of that communications component. Additionally or alternatively, any communications circuitry (e.g., one or more of communications circuitries 116, 118, 120, and 122) may share portions of memory 104 and/or may include its own memory (not shown) that may exist as a separate memory component, for example, to store data for that communications circuitry.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 108 may be an independent keyboard or mouse within its own housing that may wirelessly or through a wire communicate with processor 102, which may be provided within its own housing).

Figure 2:
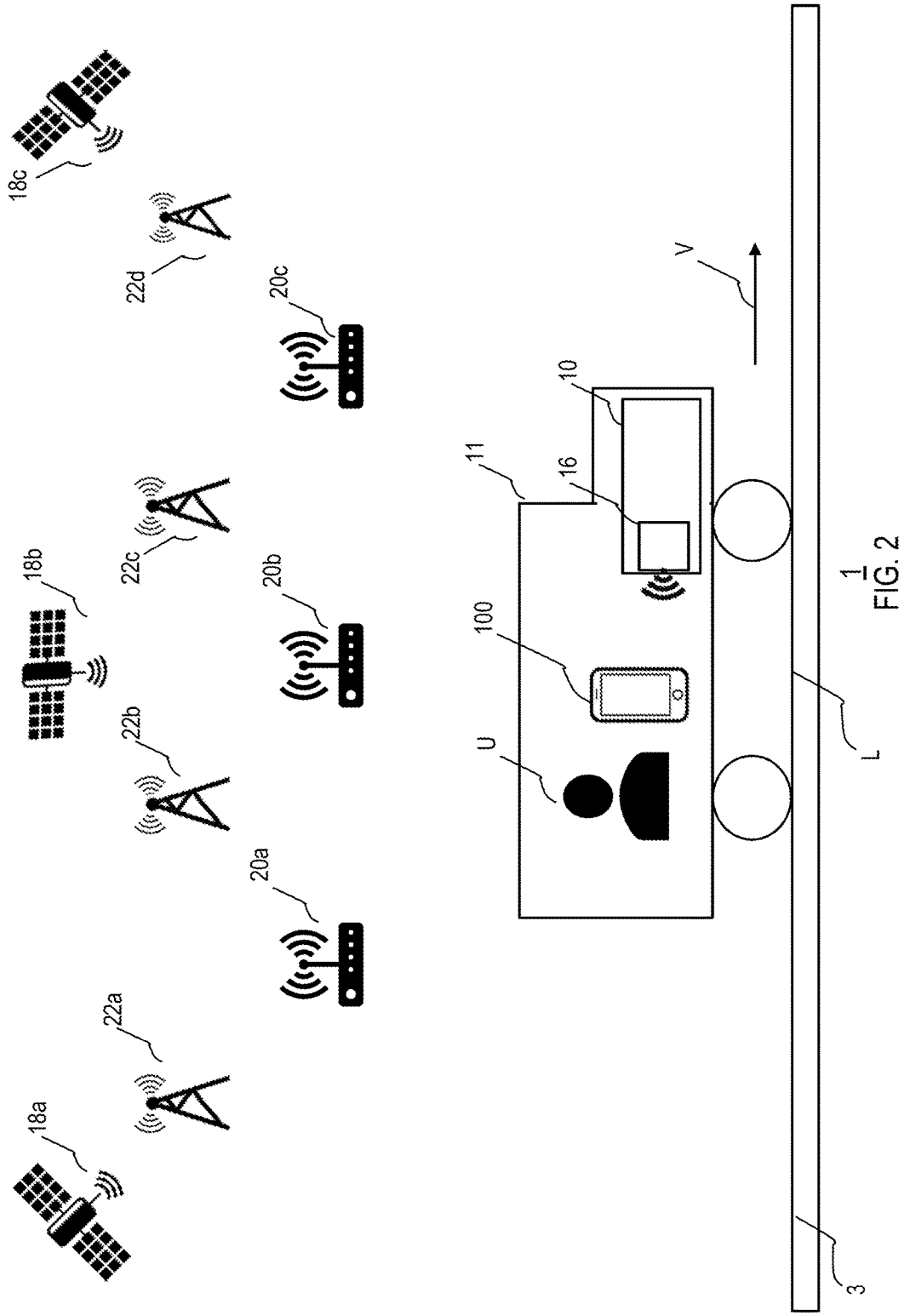
FIG. 2 is a diagram of an illustrative system in which the electronic device of FIG. 1 may be used to manage movement states.

As shown in FIG. 2, one specific example of electronic device 100 may be a handheld or otherwise portable electronic device, such as an iPhone™, that may be carried by or otherwise brought with a user U wherever it travels. For example, device 100 may travel with user U wherever user U may walk, run, cycle, or drive (e.g. in vehicle 11 equipped with computer 10 including short range wireless communications component 16) along surface 3 within an environment of system 1 that may also include one or more satellites 18a, 18b, and 18c, WAPs 20a, 20b, and 20c, and base stations 22a, 22b, 22c, and 22d. Any suitable data may be communicated between short range wireless communications circuitry 116 of device 100 and short range wireless communications component 16 of computer 10 of vehicle 11 or otherwise when short range wireless communications circuitry 116 and short range wireless communications component 16 are communicatively coupled to one another (e.g., when within a suitable threshold distance of one another and each are activated and enabled to communicate with one another (e.g., due to user choice or automatic configuration characteristics)). In some embodiments, short range wireless communications circuitry 116 of device 100 and short range wireless communications component 16 of computer 10 may be communicatively coupled via a wired connection between connectors of the devices (e.g., a universal serial bus connector port of component 16 and any suitable data connector port of circuitry 116), such that the communicative coupling and any data shared over such a communicative coupling is not wireless but via one or more conductive cables extending between circuitry 116 and component 16. Any suitable communicative coupling between device 100 and computer 10 may facilitate streaming of media between device 100 and device 10 and/or the launch of a connectivity solution that may use a user interface of device 100 on computer 10 (e.g., CarPlay™ of Apple Inc.) and/or any other suitable functionality, where device 100 may be operative to automatically determine that device 100 is communicatively coupled to a particular vehicle or a particular type of vehicle when circuitry 16 is communicatively coupled to component 16 of computer 10 of vehicle 11. Computer 10 may be any suitable computer associated with any suitable vehicle 11, such as an on-board diagnostic ("OBD") system or multimedia system of a car, truck, motorcycle, boat, plane, drone, and/or the like. In some embodiments, computer 10 may be operative to communicate the speed or any other suitable characteristic of vehicle 11 (e.g., as detected by the OBD system from a motor or otherwise of vehicle 11) to device 100 via the communicative coupling of component 16 and circuitry 116. Any suitable data may be communicated between satellite navigation communications circuitry 118 of device 100 and one or more satellites (e.g., one or more of satellites 18a, 18b, and 18c) when satellite navigation communications circuitry 118 and such a satellite are communicatively coupled to one another (e.g., when within a suitable threshold distance of one another and each are activated and enabled to communicate with one another (e.g., due to user choice or automatic configuration characteristics)). Any suitable data may be communicated between WLAN communications circuitry 120 of device 100 and one or more WAPs (e.g., one or more of WAPs 20a, 20b, and 20c) when WLAN communications circuitry 120 and such a WAP are communicatively coupled to one another (e.g., when within a suitable threshold distance of one another and each are activated and enabled to communicate with one another (e.g., due to user choice or automatic configuration characteristics)). Any suitable data may be communicated between baseband communications circuitry 122 of device 100 and one or more base stations (e.g., one or more of base stations 22a, 22b, 22c, and 22d) when baseband communications circuitry 122 and such a base station are communicatively coupled to one another (e.g., when within a suitable threshold distance of one another and each are activated and enabled to communicate with one another (e.g., due to user choice or automatic configuration characteristics)).

While some electronic devices may be configured to classify motion based solely on motion sensor data collected by one or more motion sensors local to the electronic device, relying exclusively on such motion sensor data to determine what type of activity is being performed can lead to inaccuracies. For example, accelerometer signals collected by motion sensor circuitry 112 while a user is walking with device 100 may look similar to accelerometer signals that may be collected by motion sensor circuitry 112 when a user is cycling with device 100. As another example, accelerometer signals collected by motion sensor circuitry 112 when a user is cycling with device 100 may look similar to accelerometer signals that may be collected by motion sensor circuitry 112 while a user is riding in a vehicle with device 100 (e.g., vehicle 11 experiencing low vibrations (e.g., while traveling along surface 3)).

Therefore, to avoid misclassification of a user's current activity (e.g., to avoid misclassification of a current motion activity of device 100), electronic device 100 may be configured to use additional information in addition to and/or as an alternative to any motion sensor data sensed by any motion sensors of motion sensor circuitry 112 to characterize or classify a movement state of device 100 when appropriate or when available. For example, any processing circuitry (e.g., a movement module) of device 100 may be configured to gather and to process additional data, in combination with or as an alternative to motion classification data from motion characterization circuitry of or associated with motion sensor circuitry 112, such as any suitable communications data from any suitable communications circuitry 114 (e.g., data from one or more of communications circuitries 116, 118, 120, and 122, which may be indicative of a speed and/or location of device 100), to determine what type of movement is being experienced by device 100. For example, any suitable data from one or more of communications circuitries 116, 118, 120, and 122 may be indicative of a speed of device 100 (e.g., a speed V along surface 3) and/or a location of device 100 (e.g., a location L along surface 3) and may be synthesized with motion classification data from motion characterization circuitry based on motion sensor data from motion sensor circuitry 112 to more efficiently and/or effectively classify a movement state of device 100.

Figure 3:
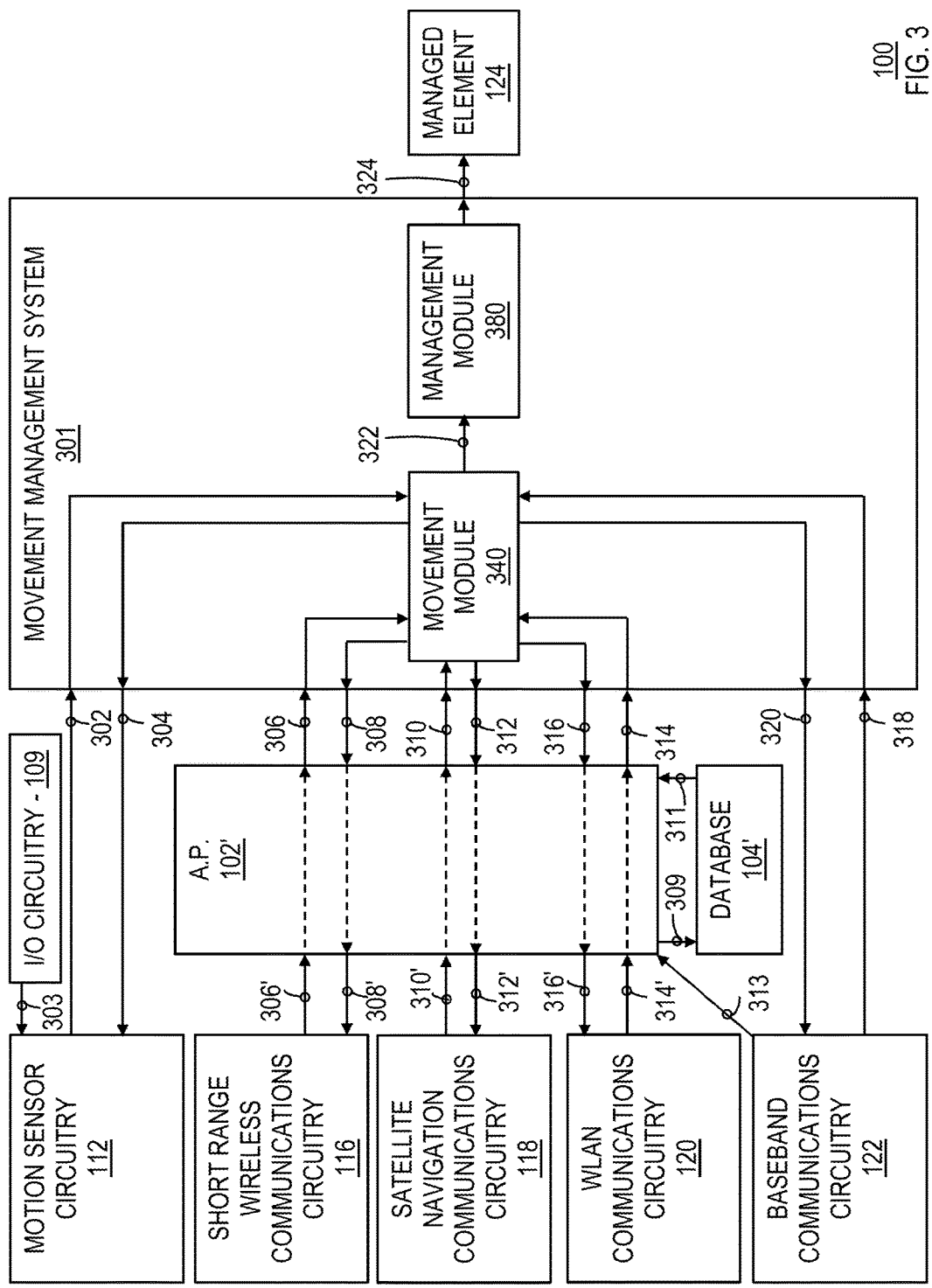
FIG. 3 is a schematic view of an illustrative portion of the electronic device of FIGS. 1 and 2.

FIG. 3 shows a schematic view of a movement management system 301 of electronic device 100 that may be provided to manage movement states of device 100 (e.g., to determine a movement state of device 100 and to manage a mode of operation of device 100 based on the determined movement state). In addition to or as an alternative to using motion sensor data that may be provided by one or more motion sensors of motion sensor circuitry 112 and/or motion classification data that may be provided by any motion characterization circuitry based on any such motion sensor data, movement management system 301 may use various other types of data that may be accessible to device 100 in order to determine the current movement state of device 100, such as any suitable data provided by one or more of communications circuitries 116, 118, 120, and 122 of device 100. In response to determining the current movement state of device 100, movement management system 301 may apply at least one movement-based mode of operation to at least one managed element 124 (e.g., any suitable component and/or application) of device 100 based on the determined current movement state (e.g., to suppress certain types of user interface experiences (e.g., notifications of received text messages or any other suitable events) when it is determined that device 100 is in a moving vehicle (e.g., driving state) so as not to distract the driving user). For example, as shown in FIG. 3, movement management system 301 may include a movement module 340 and a management module 380.

Movement module 340 of movement management system 301 may be configured to use various types of data accessible to device 100 in order to determine (e.g., characterize) the current movement state of device 100. As shown, movement module 340 may be configured to receive motion data 302 from motion sensor circuitry 112 (e.g., directly or via any suitable application processor (not shown)), where motion data 302 may include any suitable motion sensor data that may be provided by one or more motion sensors of motion sensor circuitry 112 and/or any suitable motion classification data that may be provided by any motion characterization circuitry based on any such motion sensor data.

Motion sensor circuitry 112 may include any suitable motion characterization circuitry that may be operative to continuously or periodically track, store, and/or process any motion sensor data from one or more motion sensors of motion sensor circuitry 112 to make a determination of a classification of a current motion of device 100 or of a current activity being performed by a user carrying or traveling with device 100 (e.g., stationary, walking, running, cycling, riding in a vehicle, etc.). In such embodiments, motion sensor circuitry 112 may include one or more motion sensors, processing circuitry, and memory that may, for example, form at least part or all of a system-on-chip integrated circuit. Some or all of the motion data sensed by one or more of the motion sensors of motion sensor circuitry 112 and/or any motion characterization or classification of a current motion determined by any motion characterization circuitry of motion sensor circuitry 112 or by any other component of device 100 may be used in any suitable manner. For example, applications (e.g., application 103) that may run on device 100, such as fitness applications, activity logging applications, mapping applications, journaling applications, and any other applications, may use such data to track, log, and/or record a user's physical activity. If desired, user interface elements may be adjusted or controlled based on such user activity information or applications may be launched on device 100 based on such user activity information.

Motion sensor circuitry 112 may be configured to transmit motion data 302 to movement module 340 whenever motion sensor circuitry 112 detects any new motion sensor data and/or any motion above a certain threshold and/or whenever a new motion classification has been determined based on any suitable motion sensor data. In other embodiments, motion sensor circuitry 112 may not include any application logic and/or may always provide real-time motion data 302 to movement module 340. In yet other embodiments, motion sensor circuitry 112 may be configured to provide motion data 302 to movement module 340 in response to receiving any suitable motion data request 304 from movement management system 301 (e.g., from movement module 340). In some embodiments, a power management state or mode of movement management system 301 (e.g., of movement module 340) and/or of motion sensor circuitry 112 may determine when motion data 302 may be provided to movement module 340. For example, when movement module 340 is in an idle, sleep, hibernation, or any other suitable lower power mode, motion sensor circuitry 112 may be configured to provide motion data 302 to movement module 340 when it is determined that such motion data 302 may be indicative of a probable movement state change. Alternatively, when movement module 340 is in an active or any other suitable higher power mode, movement module 340 may be configured to generate and a transmit motion data request 304 to motion sensor circuitry 112 in order to receive motion data 302 at various suitable times, such as at specific time intervals (e.g., at every suitable epoch (e.g., 2.56 seconds)).

Motion characterization circuitry of device 100 (e.g., of motion sensor circuitry 112) may be operative to determine a type of activity being performed and/or to generate a motion characterization or classification of a current activity being performed at least partially based on motion sensor data detected by one or more motion sensors of motion sensor circuitry 112. For example, such motion characterization circuitry may be operative to determine a user's cadence based on motion sensor data sensed by and output from one or more motion sensors of motion sensor circuitry 112. Based on the detected user's cadence, such motion characterization circuitry may be operative to determine or attempt to classify the type of activity being performed by the user in possession of device 100. For example, motion characterization circuitry may determine that cadences below a given threshold correspond to walking, whereas cadences above the given threshold correspond to running. In some embodiments, motion data 302 (e.g., a classification of a current motion of device 100 or of a current activity being performed by a user carrying or otherwise traveling with device 100 (e.g., stationary, walking, running, cycling, riding in a vehicle, etc.)) may be generated independent of any accessible data or entity remote from device 100 (e.g., motion data 302 may be based on current motion data obtained only by motion sensor circuitry 112 and not any current communication data obtained from remote devices or systems (e.g., via communications circuitry 114, such as a GPS system)). Alternatively, in some embodiments, motion data 302 (e.g., a classification of a current motion of device 100 or of a current activity being performed by a user carrying or traveling with device 100 (e.g., stationary, walking, running, cycling, riding in a vehicle, etc.)) may not necessarily be determined independent of any accessible data or entity remote from device 100 (e.g., motion data 302 may be based not only on current motion data obtained by motion sensor circuitry 112 but also on any communication data obtained from any remote devices or systems (e.g., a device speed or location data as may be determined based on communication data from satellite navigation communications circuitry 118 (e.g., GPS data))). For example, motion characterization circuitry of motion sensor circuitry 112 and/or movement module 340 may determine that detected cadences above a given cadence threshold correspond to cycling but only when any detected speed (e.g., average speed detected based on data from satellite navigation communications circuitry 118) is also above a given speed threshold (e.g., 5.5 miles per hour).

In some embodiments, motion data 302 may include information indicative of a confidence level for each detectable motion class (e.g., a first confidence level value for stationary, a second confidence level value for walking, a third confidence level value for running, a fourth confidence level value for cycling, and a fifth confidence level value for in-vehicle) for providing motion classification information to movement module 340. For example, a likelihood buffer for one, some, or each motion class may be populated in response to detecting a particular type of motion by a particular motion sensor. In some embodiments, motion sensor circuitry 112 may be configured to analyze other data determined remotely from any motion sensors of motion sensor circuitry 112 to help determine a motion classification confidence level. For example, if a particular motion is detected by motion sensor circuitry 112 that is determined with some confidence to be indicative of an in-vehicle motion classification (e.g., a vibration motion is detected that is similar to an expected vibration when device 100 is positioned within a vehicle driving along a road), device 100 may be configured to populate a likelihood buffer for an in-vehicle motion classification based on such detected motion, but only if one or more other events have not also been detected by device 100 in the same moment (e.g., in the same particular epoch) as such motion was detected by motion sensors(s) of motion sensor circuitry 112, where such events may include any events that may vibrate device 100 other than an in-vehicle event, such as, for example, a user input event on an input component of the electronic device (e.g., a touch event detected on an activated I/O touch screen (e.g., an input component 108) of device 100) and/or an output event of an output component of the electronic device (e.g., a haptic event generated by a haptic element (e.g., an output component 110) of device 100 and/or an audio event generated by an audio output element (e.g., an output component 110) of device 100), where such an event may be indicated by I/O data 303 that may be provided by I/O component circuitry 109 to motion sensor circuitry 112. Movement module 340 may be operative to receive motion data 302 with a confidence level (e.g., a likelihood buffer score) for each motion class at any suitable interval (e.g., each epoch) but may be operative to buffer different motion class confidence level scores to build up confidence in the scores of one or more motion classes over time (e.g., buffer scores over a minute to reduce occurrence of any jumpy transitions between movement states, as variance between motion class confidence level scores for a particular motion class between two consecutive sets of motion data 302 may be based on noise that should not be considered when determining a device movement state).

Motion sensor circuitry 112 may include or utilize any suitable Markov model and/or Bayesian network and/or the like in order to provide a motion classifier that may be operative to process motion sensor data from one or more motion sensors of device 100 in order to determine a likelihood score for each motion class of a group of motion classes. For example, a group of motion classes may include any suitable number of motion classes of any suitable type, including, but not limited to, slow walking, normal walking, running, cycling with device attached to chassis of bicycle, cycling with device attached to user's torso, cycling with device attached to user's leg, driving with device stowed (e.g., in a device holder or cup holder or the like in the vehicle), driving with device on user (e.g., in a user's pocket while in the vehicle, etc.), and stationary (e.g., unknown motion or semi-stationary state or the like). In such instances, at any suitable periodic interval, such as every epoch of device 100 (e.g., every 2.56 seconds), a motion classifier may analyze all available motion sensor data and generate a likelihood motion class score for each motion class of a group of motion classes (e.g., a group of the nine (9) motion classes listed above) for that epoch. Whichever motion class has the highest motion class score for a particular epoch will be identified as the raw motion call for that epoch. Each likelihood motion class score and/or the raw motion call for each epoch may be provided as at least a portion of motion data 302 by the motion classifier of motion sensor circuitry 112 to movement module 340.

Motion sensor circuitry 112 or movement module 340 may manage a likelihood accumulation buffer that may be operative to serve as a condition or an additional source of confidence for a driving (e.g., in vehicle) type of motion class. For example, at each periodic interval (e.g., epoch), such a likelihood accumulation buffer may be operative to calculate the sum of the likelihood motion class score for each driving type of motion class (e.g., the sum of the likelihood motion class score for driving with device stowed and the likelihood motion class score for driving with device on user) for each of any number of most recently generated likelihood scores less the likelihood score for the stationary (e.g., unknown motion or semi-stationary state or the like) motion class for each of that number of most recently generated likelihood scores, and then compare that result to a particular threshold value, and then, if the result is greater than the particular threshold value and if the raw motion call for that epoch is a driving type of motion class, that driving type of motion class may remain the raw motion call or be given an extra weight of confidence. For example, at every epoch, in addition to determining the likelihood motion class score for each motion class, device 100 may also be operative to determine whether or not a particular threshold value is less than the result (e.g., likelihood accumulation buffer score) of the sum of all driving type motion class scores from the last 24 epochs (e.g., over the last minute) less the sum of the stationary motion class scores from the last 24 epochs. In such an example, at every epoch, the driving and stationary motion class scores from 25 epochs ago may be discarded from the buffer and the driving and stationary motion class scores from the most recent epoch may be added to the buffer so that a new likelihood accumulation buffer score may be calculated and compared to the threshold value. In some embodiments, the likelihood motion class scores in the likelihood accumulation buffer may not be updated for a particular epoch if a particular event was detected during that epoch. For example, if a touch event is detected on an activated I/O touch screen (e.g., an input component 108) of device 100 and/or a haptic event is generated by a haptic element (e.g., an output component 110) of device 100 and/or an audio event is generated by an audio output element (e.g., an output component 110) of device 100 (e.g., as may be indicated by I/O data 303 that may be provided by I/O component circuitry 109 to motion sensor circuitry 112 (or to movement module 340)) during the most recent epoch, then the driving and stationary likelihood scores from that epoch may not be added to the likelihood accumulation buffer and the oldest driving and stationary scores may be maintained in the likelihood accumulation buffer such that the likelihood accumulation buffer score for that epoch will be the same as the likelihood accumulation buffer score from the previous epoch. This may prevent certain events that are known to vibrate device 100 from affecting the likelihood accumulation buffer score.

Motion sensor circuitry 112 may include or utilize any suitable algorithm(s) or otherwise for detecting any steps taken by a user (e.g., for incrementing a step counter (e.g., for a pedometer application)), where such step counting may require detection of a particular number of consecutive steps within a particular threshold of time before being confident enough to begin incrementing the step counter. Such a step counter functionality of motion sensor circuitry 112 may be more robust than any walking motion classification by the motion classifier. Therefore, at every suitable period (e.g., epoch) or otherwise, based on motion sensor data detected by any motion sensor components (e.g., each motion sensor component of motion sensor circuitry 112), movement module 340 may determine or receive (e.g., from motion data 302) a likelihood motion class score for each motion class and/or for each group of motion classes, a raw motion call, a determination of whether a likelihood accumulation buffer score is greater than a particular threshold, and/or a state of a step counter (e.g., whether the step counter is incrementing).

While motion data 302 may be indicative of a confident motion classification for stationary, walking, running, and even cycling and/or may be operative to enable movement module 340 to confidently determine stationary, walking, running, and even cycling movement states without analyzing any other data sources (e.g., if a likelihood motion class score for walking is determined to be above a particular threshold and no other likelihood motion class scores meet a threshold for its particular type of motion), motion data 302 is often not indicative of a confident motion classification for in-vehicle (e.g., driving), despite, for example, motion data 302 perhaps being indicative of motion sensor detected accelerometer-based vehicle-road contact vibration motion and a raw motion call for a driving type motion and/or a high likelihood motion class score for a driving type motion and/or a determination that a likelihood accumulation buffer score is greater than a particular threshold. Therefore, movement module 340 may benefit from the availability of data from one or more communications circuitry sources that may be indicative of a speed and/or location of device 100 in order to be used by movement module 340 with or without any motion data 302 to determine an in-vehicle (e.g., driving) movement state more reliably and more confidently.

Movement module 340 may also be configured to use various other types of data accessible to device 100, in addition to or as an alternative to motion data 302, in order to determine the current movement state of device 100. For example, as shown in FIG. 3, movement module 340 may also be configured to receive short range communications circuitry data 306 from short range communications circuitry 116 (e.g., directly or via any suitable application processor 102'). Such short range communications circuitry data 306 may be indicative of any suitable data received by communications circuitry 116 from a remote source or any suitable data indicative of the remote source to which communications circuitry 116 is communicatively coupled. For example, when communications circuitry 116 is communicatively coupled to communications component 16 of computer 10 (e.g., of vehicle 11) (e.g., via a wired connection or a wireless communication protocol supported by communications circuitry 116 (e.g., BlueTooth™)), short range communications circuitry data 306 may be indicative of that coupling (e.g., data indicative of computer 10 being communicatively coupled to device 100 via a short range communications protocol) and/or short range communications circuitry data 306 may be indicative of any other suitable data being communicated between communications circuitry 116 and computer 10 (e.g., data indicative of the speed of vehicle 11 as may be determined by computer 10). Therefore, in some embodiments, short range communications circuitry data 306 may be indicative of the initiation of a short range communication coupling between communications circuitry 116 and any particular remote entity (e.g., a vehicle remote entity), of the continued existence of such a short range communication coupling, the termination of such a short range communication coupling, and/or of any suitable data communicated to device 100 via such a short range communication coupling. Such short range communications circuitry data 306 may be indicative of a speed of device 100 and/or of a particular type of vehicle environment of device 100, either of which may be used by system 301 to better determine a current movement state of device 100 (e.g., stationary or driving (or any other type of motion of a particular vehicle with which device 100 may be communicatively coupled via communications circuitry 116)).

Short range communications circuitry 116 may be configured to communicate short range communications circuitry data 306 directly to movement module 340 at any suitable moment, such as whenever short range communications circuitry 116 detects a communicative coupling to (or communicative de-coupling from) any remote entity and/or whenever short range communications circuitry 116 receives at least certain types of data via such a communicative coupling. In other embodiments, short range communications circuitry 116 may be configured to provide short range communications circuitry data 306 to movement module 340 in response to receiving a short range communications circuitry data request 308 from movement module 340. For example, movement module 340 may be configured to generate and transmit a short range communications circuitry data request 308 to short range communications circuitry 116 only when movement module 340 determines that short range communications circuitry data 306 may be helpful for determining a current movement state of device 100. For example, movement module 340 may be configured to determine the current movement state of device 100 utilizing only motion data 302 (e.g., when motion data 302 is sufficient to provide movement module 340 with enough data to reliably determine the current movement state of device 100). However, movement module 340 may often receive motion data 302 that alone is insufficient to provide movement module 340 with the confidence it may need to reliably determine the current movement state of device 100. In such cases, movement module 340 may be configured to generate and transmit a short range communications circuitry data request 308 to short range communications circuitry 116 in order to receive short range communications circuitry data 306, such that movement module 340 may utilize short range communications circuitry data 306 in conjunction with motion data 302 to more reliably determine the current movement state of device 100.

A power management state or mode of movement management system 301 (e.g., of movement module 340) and/or of AP 102' and/or of short range communications circuitry 116 may be operative to determine when short range communications circuitry data 306 may be provided to movement module 340. For example, when movement module 340 is in an idle, sleep, hibernation, or any other suitable lower power mode, short range communications circuitry 116 may be configured to provide short range communications circuitry data 306 to movement module 340 when it is determined that such short range communications circuitry data 306 may be indicative of a probable movement state change (e.g., data indicative of a connection to a vehicle, data indicative of termination of a connection to a vehicle, data indicative of as speed of a connected vehicle, etc.). Alternatively, when movement module 340 is in an active or any other suitable higher power mode, movement module 340 may be configured to generate and transmit a short range communications circuitry data request 308 to short range communications circuitry 116 in order to receive short range communications circuitry data 306 at various suitable times, such as at any detected movement state change (e.g., based on new motion data 302) and/or at specific time intervals (e.g., at every suitable epoch (e.g., 2.56 seconds)).

As shown in FIG. 3, for example, any suitable processing circuitry 102', which may be distinct from communications circuitry 116 and movement module 340, may be utilized in order to access such information from communications circuitry 116. For example, processing circuitry 102' may be any suitable system on chip ("SOC") and/or any suitable system in package ("SIP") mobile application processor that may be operative to power at least a portion of the functionality of device 100, where processing circuitry 102' may combine a central processing unit ("CPU") with other components into a single compact physical package (e.g., to meet the certain power and space constraints). In such embodiments, processing circuitry 102', which may also be referred to herein as application processor ("AP") 102', may be configured to function in a low power (e.g., sleep) mode for significant portions of the time that device 100 is functional. In such embodiments, rather than a short range communications circuitry data request 308 being communicated directly from movement module 340 to communications circuitry 116 and/or rather than short range communications circuitry data 306 being communicated directly from communications circuitry 116 to movement module 340, AP 102' may be operative to receive and process short range communications circuitry data request 308 from movement module 340 and then generate and communicate related short range communications circuitry data request 308' to communications circuitry 116 and/or AP 102' may be operative to receive and process short range communications circuitry data 306' from communications circuitry 116 and then generate and communicate related short range communications circuitry data 306 to movement module 340. In such embodiments, AP 102' may process data 306' for generating data 306 and/or process data 308 for generating data 308' using any suitable processes that may be appropriate for communications circuitry 116, and/or using any suitable supplemental data 311 that may be accessible to AP 102' from any suitable data source (e.g., database 104', which may be any suitable data structure available in any suitable manner to device 100) via any suitable supplemental data request 309. Therefore, in some specific embodiments, when AP 102' may be utilized to facilitate communication between short range communications circuitry 116 and movement module 340 (e.g., as may be provided by a motion co-processor), a short range communications circuitry data request 308 may be communicated to AP 102', which, if awake or configured to be awoken by such a short range communications circuitry data request 308, may process the short range communications circuitry data request 308 and generate and communicate a related short range communications circuitry data request 308' to short range communications circuitry 116, responsive to which short range communications circuitry 116 may share short range communications circuitry data 306' that may be processed by processor 102' for providing short range communications circuitry data 306 to movement module 340. Alternatively, such an AP 102' may be in a sleep mode and configured not to handle any data request 308 when in such a sleep mode, such that no response data 306 may be returned to movement module 340. Alternatively, in some embodiments, as mentioned, short range communications circuitry data 306 may be accessed by movement module 340 directly from communications circuitry 116 without the need for any intermediate processing circuitry 102'.

Movement module 340 may also be configured to use various other types of data accessible to device 100, in addition to or as an alternative to one or more of motion data 302 and short range communications circuitry data 306, in order to determine the current movement state of device 100. For example, as shown in FIG. 3, movement module 340 may also be configured to receive satellite navigation communications circuitry data 310 from satellite navigation communications circuitry 118 (e.g., directly or via any suitable application processor 102'). Such satellite navigation communications circuitry data 310 may be indicative of any suitable data received by communications circuitry 118 from one or more remote sources or any suitable data indicative of the remote source(s) to which communications circuitry 118 is communicatively coupled. For example, when satellite navigation communications circuitry 118 is communicatively coupled to one or more satellites (e.g., one or more of satellites 18a, 18b, and 18c of system 1 of FIG. 2), satellite navigation communications circuitry data 310 may be indicative of that coupling (e.g., data indicative of one or more satellites being communicatively coupled to or decoupled from device 100) and/or satellite navigation communications circuitry data 310 may be indicative of any other suitable data being communicated between one or more satellites and communications circuitry 118 and/or data indicative of a location or speed of device 100 (e.g., as may be calculated by circuitry 118 and/or AP 102' and/or movement module 340 based on certain data being communicated between one or more satellites and communications circuitry 118 (e.g., the location of device 100 may be determined based on data received by communications circuitry 118 from one or more satellites, and any change in the determined location of device 100 over time may be analyzed to determine an approximate (e.g., average) speed of device 100)). Therefore, in some embodiments, satellite navigation communications circuitry data 310 may be indicative of any suitable information related to and/or received from one or more communicatively coupled satellites, and/or any suitable speed or location or direction of device 100 that may be derived from such information. Such satellite navigation communications circuitry data 310 may be indicative of a speed of device 100 and/or of a particular location of device 100 and/or of a particular direction of device 100, any of which may be used by system 301 to better determine a current movement state of device 100 (e.g., stationary or walking or running or cycling or driving or the like).

Satellite navigation communications circuitry 118 may be configured to communicate satellite navigation communications circuitry data 310 directly to movement module 340 at any suitable moment, such as whenever satellite navigation communications circuitry 118 receives at least certain types of data via a communicative coupling with any suitable satellite. In other embodiments, satellite navigation communications circuitry 118 may be configured to provide satellite navigation communications circuitry data 310 to movement module 340 in response to receiving a satellite navigation communications circuitry data request 312 from movement module 340. For example, movement module 340 may be configured to generate and transmit a satellite navigation communications circuitry data request 312 to satellite navigation communications circuitry 118 only when movement module 340 determines that satellite navigation communications circuitry data 310 may be helpful for determining a current movement state of device 100. For example, movement module 340 may be configured to determine the current movement state of device 100 utilizing only motion data 302 (e.g., when motion data 302 is sufficient to provide movement module 340 with enough data to reliably determine the current movement state of device 100) and/or utilizing only short range communications circuitry data 306 (e.g., when short range communications circuitry data 306 is sufficient to provide movement module 340 with enough data to reliably determine the current movement state of device 100) and/or utilizing only a combination of motion data 302 and short range communications circuitry data 306 (e.g., when motion data 302 and short range communications circuitry data 306 together is sufficient to provide movement module 340 with enough data to reliably determine the current movement state of device 100). However, movement module 340 may often receive motion data 302 and/or short range communications circuitry data 306 that alone or in any combination is insufficient to provide movement module 340 with the confidence it may need to reliably determine the current movement state of device 100. In such cases, movement module 340 may be configured to generate and transmit satellite navigation communications circuitry data request 312 to satellite navigation communications circuitry 118 in order to receive satellite navigation communications circuitry data 310, such that movement module 340 may utilize satellite navigation communications circuitry data 310 alone or in conjunction with any available motion data 302 and/or any available short range communications circuitry data 306 to more reliably determine the current movement state of device 100.

A power management state or mode of movement management system 301 (e.g., of movement module 340) and/or of AP 102' and/or of satellite navigation communications circuitry 118 may be operative to determine when satellite navigation communications circuitry data 310 may be provided to movement module 340. For example, when movement module 340 is in an idle, sleep, hibernation, or any other suitable lower power mode, satellite navigation communications circuitry 118 may be configured to provide satellite navigation communications circuitry data 310 to movement module 340 when it is determined that such satellite navigation communications circuitry data 310 may be indicative of a probable movement state change (e.g., data indicative of a new location or a new speed of device 100). Alternatively, when movement module 340 is in an active or any other suitable higher power mode, movement module 340 may be configured to generate and transmit satellite navigation communications circuitry data request 312 to satellite navigation communications circuitry 118 in order to receive satellite navigation communications circuitry data 310 at various suitable times, such as at any detected movement state change (e.g., based on new motion data 302 and/or based on new short range communications circuitry data 306) and/or at specific time intervals (e.g., at every suitable epoch (e.g., 2.56 seconds)).

As shown in FIG. 3, for example, any suitable processing circuitry 102' that may be distinct from communications circuitry 118 and movement module 340 may be utilized in order to access such information from communications circuitry 118. In such embodiments, processing circuitry 102', which may also be referred to herein as AP 102', may be configured to function in a low power (e.g., sleep) mode for significant portions of the time that device 100 is functional. In such embodiments, rather than satellite navigation communications circuitry data request 312 being communicated directly from movement module 340 to communications circuitry 118 and/or rather than satellite navigation communications circuitry data 310 being communicated directly from communications circuitry 118 to movement module 340, AP 102' may be operative to receive and process satellite navigation communications circuitry data request 312 from movement module 340 and then generate and communicate related satellite navigation communications circuitry data request 312' to communications circuitry 118 and/or AP 102' may be operative to receive and process satellite navigation communications circuitry data 310' from communications circuitry 118 and then generate and communicate related satellite navigation communications circuitry data 310 to movement module 340. In such embodiments, AP 102' may process data 310' for generating data 310 and/or process data 312 for generating data 312' using any suitable processes that may be appropriate for communications circuitry 118, and/or using any suitable supplemental data 311 that may accessible to AP 102' from any suitable data source (e.g., database 104', which may be any suitable data structure available in any suitable manner to device 100) via any suitable supplemental data request 309. Therefore, in some specific embodiments, when AP 102' may be utilized to facilitate communication between satellite navigation communications circuitry 118 and movement module 340 (e.g., as may be provided by a motion co-processor), satellite navigation communications circuitry data request 312 may be communicated to AP 102', which, if awake or configured to be awoken by such a satellite navigation communications circuitry data request 312, may process satellite navigation communications circuitry data request 312 and generate and communicate a related satellite navigation communications circuitry data request 312' to satellite navigation communications circuitry 118, responsive to which satellite navigation communications circuitry 118 may share satellite navigation communications circuitry data 310' that may be processed by processor 102' for providing satellite navigation communications circuitry data 310 to movement module 340. Alternatively, such an AP 102' may be in a sleep mode and configured not to handle any request data 312 when in such a sleep mode, such that no response data 310 may be returned to movement module 340. Alternatively, in some embodiments, as mentioned, satellite navigation communications circuitry data 310 may be accessed by movement module 340 directly from communications circuitry 118 without the need for any intermediate processing circuitry 102'.

Movement module 340 may also be configured to use various other types of data accessible to device 100, in addition to or as an alternative to one or more of motion data 302, short range communications circuitry data 306, and satellite navigation communications circuitry data 310, in order to determine the current movement state of device 100. For example, as shown in FIG. 3, movement module 340 may also be configured to receive WLAN communications circuitry data 314 from WLAN communications circuitry 120 (e.g., directly or via any suitable application processor 102'). Such WLAN communications circuitry data 314 may be indicative of any suitable data received by communications circuitry 120 from one or more remote sources or any suitable data indicative of the remote source(s) to which communications circuitry 120 is communicatively coupled. For example, when WLAN communications circuitry 120 is communicatively coupled to one or more WAPs (e.g., one or more of WAPs 20a, 20b, and 20c), WLAN communications circuitry data 314 may be indicative of that coupling (e.g., data indicative of one or more WAPs being communicatively coupled to or decoupled from device 100) and/or WLAN communications circuitry data 314 may be indicative of any other suitable data being communicated between one or more WAPs and communications circuitry 120 and/or data indicative of a location or speed of device 100 (e.g., as may be calculated by circuitry 120 and/or AP 102' and/or movement module 340 based on certain data being communicated between one or more WAPs and communications circuitry 120 (e.g., the location of device 100 may be determined based on data received by communications circuitry 120 from one or more WAPs (e.g., WAP identification data of each WAP (e.g., a unique WAP identifier, such as a media access control ("MAC") address) and strength of signal(s) received from each WAP), and any change in the determined location of device 100 over time may be analyzed to determine an approximate (e.g., average) speed of device 100)). Therefore, in some embodiments, WLAN communications circuitry data 314 may be indicative of any suitable information related to and/or received from one or more communicatively coupled WAPs, and/or any suitable speed or location of device 100 that may be derived from such information. Such WLAN communications circuitry data 314 may be indicative of a speed of device 100 and/or of a particular location of device 100, either of which may be used by system 301 to better determine a current movement state of device 100 (e.g., stationary or walking or running or cycling or driving or the like).

WLAN communications circuitry 120 may be configured to communicate WLAN communications circuitry data 314 directly to movement module 340 at any suitable moment, such as whenever WLAN communications circuitry 120 receives at least certain types of data via a communicative coupling with any suitable WAP. In other embodiments, WLAN communications circuitry 120 may be configured to provide WLAN communications circuitry data 314 to movement module 340 in response to receiving a WLAN communications circuitry data request 316 from movement module 340. For example, movement module 340 may be configured to generate and transmit a WLAN communications circuitry data request 316 to WLAN communications circuitry 120 only when movement module 340 determines that WLAN communications circuitry data 314 may be helpful for determining a current movement state of device 100. For example, movement module 340 may be configured to determine the current movement state of device 100 utilizing only motion data 302 (e.g., when motion data 302 is sufficient to provide movement module 340 with enough data to reliably determine the current movement state of device 100) and/or utilizing only short range communications circuitry data 306 (e.g., when short range communications circuitry data 306 is sufficient to provide movement module 340 with enough data to reliably determine the current movement state of device 100) and/or utilizing only satellite navigation communications circuitry data 310 (e.g., when satellite navigation communications circuitry data 310 is sufficient to provide movement module 340 with enough data to reliably determine the current movement state of device 100) and/or utilizing only any combination of motion data 302, short range communications circuitry data 306, and satellite navigation communications circuitry data 310 (e.g., when the combination of any two or more of motion data 302, short range communications circuitry data 306, and satellite navigation communications circuitry data 310 is sufficient to provide movement module 340 with enough data to reliably determine the current movement state of device 100). However, movement module 340 may often receive motion data 302 and/or short range communications circuitry data 306 and/or satellite navigation communications circuitry data 310 that alone or in any combination is insufficient to provide movement module 340 with the confidence it may need to reliably determine the current movement state of device 100. In such cases, movement module 340 may be configured to generate and transmit WLAN communications circuitry data request 316 to WLAN communications circuitry 120 in order to receive WLAN communications circuitry data 314, such that movement module 340 may utilize WLAN communications circuitry data 314 alone or in conjunction with any available motion data 302 and/or any available short range communications circuitry data 306 and/or any available satellite navigation communications circuitry data 310 to more reliably determine the current movement state of device 100.

A power management state or mode of movement management system 301 (e.g., of movement module 340) and/or of AP 102' and/or of WLAN communications circuitry 120 may be operative to determine when WLAN communications circuitry data 314 may be provided to movement module 340. For example, when movement module 340 is in an idle, sleep, hibernation, or any other suitable lower power mode, WLAN communications circuitry 120 may be configured to provide WLAN communications circuitry data 314 to movement module 340 when it is determined that such WLAN communications circuitry data 314 may be indicative of a probable movement state change (e.g., data indicative of a new location or a new speed of device 100). Alternatively, when movement module 340 is in an active or any other suitable higher power mode, movement module 340 may be configured to generate and transmit WLAN communications circuitry data request 316 to WLAN communications circuitry 120 in order to receive WLAN communications circuitry data 314 at various suitable times, such as at any detected movement state change (e.g., based on new motion data 302 and/or based on new short range communications circuitry data 306 and/or based on new satellite navigation communications circuitry data 310) and/or at specific time intervals (e.g., at every suitable epoch (e.g., 2.56 seconds)).

As shown in FIG. 3, for example, any suitable processing circuitry 102' that may be distinct from communications circuitry 120 and movement module 340 may be utilized in order to access such information from communications circuitry 120. In such embodiments, processing circuitry 102', which may also be referred to herein as AP 102', may be configured to function in a low power (e.g., sleep) mode for significant portions of the time that device 100 is functional. In such embodiments, rather than WLAN communications circuitry data request 316 being communicated directly from movement module 340 to communications circuitry 120 and/or rather than WLAN communications circuitry data 314 being communicated directly from communications circuitry 120 to movement module 340, AP 102' may be operative to receive and process WLAN communications circuitry data request 316 from movement module 340 and then generate and communicate related WLAN communications circuitry data request 316' to communications circuitry 120 and/or AP 102' may be operative to receive and process WLAN communications circuitry data 314' from communications circuitry 120 and then generate and communicate related WLAN communications circuitry data 314 to movement module 340. In such embodiments, AP 102' may process data 314' for generating data 314 and/or process data 316 for generating data 316' using any suitable processes that may be appropriate for communications circuitry 120, and/or using any suitable supplemental data 311 that may accessible to AP 102' from any suitable data source (e.g., database 104', which may be any suitable data structure available in any suitable manner to device 100) via any suitable supplemental data request 309. For example, data 314' from WLAN communications circuitry 120 may include, for each WAP communicatively coupled to circuitry 120 at a current moment in time and/or at any previous moment in time, a unique WAP identifier (e.g., MAC address) for that WAP and the strength of signal received from that WAP at a particular (e.g., timestamped) moment in time, which may provide AP 102' with a snapshot of WAPs within a communication range of communications circuitry 120 of device 100 at one or more moments in time (e.g., a log of timestamped MAC addresses and signal strengths), and AP 102' may use any suitable entity (e.g., AP 102' itself and/or database 104' that may be a remote server or local processing component of device 100 in conjunction with any suitable database) to determine a set of approximate geographic coordinates indicating where device 100 may be or may have been located at each of those one or more moments in time to generate data 314 that may be indicative of the location and/or speed of device 100 at one or more moments in time (e.g., speed may be calculated by dividing the distance between locations by the time duration between times associated with those locations), where such geographic coordinates may be determined using any suitable method (e.g., any suitable triangulation methods, time-of-flight methods, or the like using any suitable (e.g., local and/or crowdsourced) WAP location database and/or any suitable (e.g., local and/or crowdsourced) WAP signal strength profile database, etc.). Such a log of unique WAP identifiers and associated signal strengths and timestamps may be generated and stored by WLAN communications circuitry 120 (e.g., in a WLAN scan buffer of WLAN communications circuitry 120) independent of AP 102' (e.g., while AP 102' may be asleep) and then shared with AP 102' (e.g., as data 314') when AP 102' is awake such that AP 102' may be able to use such a log to estimate history of one or more speeds or locations of device 100 (e.g., as data 314). Therefore, such a WLAN log may be updated while AP 102' is asleep and then processed by AP 102' when AP 102' is awake in order to determine a speed and/or location of device 100 at one or more instances in the past when AP 102' was asleep as well as any current speed and/or location based on new WLAN log data that may be accumulated while AP 102' is awake. Therefore, in some specific embodiments, when AP 102' may be utilized to facilitate communication between WLAN communications circuitry 120 and movement module 340 (e.g., as may be provided by a motion co-processor), WLAN communications circuitry data request 316 may be communicated to AP 102', which, if awake or configured to be awoken by such a WLAN communications circuitry data request 316, may process WLAN communications circuitry data request 316 and generate and communicate a related WLAN communications circuitry data request 316' to WLAN communications circuitry 120, responsive to which WLAN communications circuitry 120 may share any suitable WLAN communications circuitry data 314' that may be processed by processor 102' for providing WLAN communications circuitry data 314 to movement module 340. Alternatively, such an AP 102' may be in a sleep mode and configured not to handle any request data 316 when in such a sleep mode, such that no response data 314 may be returned to movement module 340. Alternatively, in some embodiments, as mentioned, WLAN communications circuitry data 314 may be accessed by movement module 340 directly from communications circuitry 120 without the need for any intermediate processing circuitry 102'.

WLAN communications circuitry data 314 may be indicative of an estimated speed and/or location of device 100 at one or more previous moments in time based on the timestamps of the unique WAP identifiers and signal strengths detected and then used in determining the estimated speed(s) and/or location(s). The age of such timestamps and/or the time difference between two or more timestamps and/or any other suitable characteristic(s) of the WLAN data used to estimate one or more speeds and/or locations of device 100 may also be used by movement module 340 when determining a movement state of device 100.

Movement module 340 may also be configured to use various other types of data accessible to device 100, in addition to or as an alternative to one or more of motion data 302, short range communications circuitry data 306, satellite navigation communications circuitry data 310, and WLAN communications circuitry data 314, in order to determine the current movement state of device 100. For example, as shown in FIG. 3, movement module 340 may also be configured to receive baseband communications circuitry data 318 from baseband communications circuitry 122 (e.g., directly or via any suitable application processor 102' (not shown)). Such baseband communications circuitry data 318 may be indicative of any suitable data received by communications circuitry 122 from one or more remote sources or any suitable data indicative of the remote source(s) to which communications circuitry 122 is communicatively coupled. For example, when baseband communications circuitry 122 is communicatively coupled to one or more base stations (e.g., one or more of base stations 22a, 22b, 22c, and 22d of system 1 of FIG. 2), baseband communications circuitry data 318 may be indicative of that coupling (e.g., data indicative of one or more base stations being communicatively coupled to or decoupled from device 100) and/or baseband communications circuitry data 318 may be indicative of any other suitable data being communicated between one or more base stations and communications circuitry 122 and/or data indicative of a location or speed of device 100 (e.g., as may be calculated in any suitable manner by circuitry 122 and/or AP 102' (not shown) and/or movement module 340 based on certain data being communicated between one or more base stations and communications circuitry 122 (e.g., the location of device 100 may be determined based on data received by communications circuitry 122 from one or more base stations (e.g., similarly to location/speed calculation from data communicated between WAPs and communications circuitry 120 (e.g., based on analyzing unique identifier information of each communicatively coupled base station and signal strength of each communicatively coupled base station at one or more moments in time)))). A baseband speed estimation may be made while the device (e.g., one or more application processors or otherwise) is asleep using any suitable algorithms, which may include different modes, such as a doppler-based mode, a mode based on cell history, and/or a mode based on both cell history and doppler. Therefore, in some embodiments, baseband communications circuitry data 318 may be indicative of any suitable information related to and/or received from one or more communicatively coupled base stations, and/or any suitable speed or location of device 100 that may be derived from such information. Such baseband communications circuitry data 318 may be indicative of a speed of device 100 and/or of a particular location of device 100, either of which may be used by system 301 to better determine a current movement state of device 100 (e.g., stationary or walking or running or cycling or driving or the like).

Baseband communications circuitry 122 may be configured to communicate baseband communications circuitry data 318 directly to movement module 340 at any suitable moment, such as whenever baseband communications circuitry 122 receives at least certain types of data via a communicative coupling with any suitable base station. In other embodiments, baseband communications circuitry 122 may be configured to provide baseband communications circuitry data 318 to movement module 340 in response to receiving a baseband communications circuitry data request 320 from movement module 340. For example, movement module 340 may be configured to generate and transmit a baseband communications circuitry data request 320 to baseband communications circuitry 122 only when movement module 340 determines that baseband communications circuitry data 318 may be helpful for determining a current movement state of device 100. For example, movement module 340 may be configured to determine the current movement state of device 100 utilizing only motion data 302 (e.g., when motion data 302 is sufficient to provide movement module 340 with enough data to reliably determine the current movement state of device 100) and/or utilizing only short range communications circuitry data 306 (e.g., when short range communications circuitry data 306 is sufficient to provide movement module 340 with enough data to reliably determine the current movement state of device 100) and/or utilizing only satellite navigation communications circuitry data 310 (e.g., when satellite navigation communications circuitry data 310 is sufficient to provide movement module 340 with enough data to reliably determine the current movement state of device 100) and/or utilizing only WLAN communications circuitry data 314 (e.g., when WLAN communications circuitry data 314 is sufficient to provide movement module 340 with enough data to reliably determine the current movement state of device 100) and/or utilizing only any combination of motion data 302, short range communications circuitry data 306, satellite navigation communications circuitry data 310, and WLAN communications circuitry data 314 (e.g., when the combination of any two or more of motion data 302, short range communications circuitry data 306, satellite navigation communications circuitry data 310, and WEAN communications circuitry data 314 is sufficient to provide movement module 340 with enough data to reliably determine the current movement state of device 100). However, movement module 340 may often receive motion data 302 and/or short range communications circuitry data 306 and/or satellite navigation communications circuitry data 310 and/or WLAN communications circuitry data 314 that alone or in any combination is insufficient to provide movement module 340 with the confidence it may need to reliably determine the current movement state of device 100. In such cases, movement module 340 may be configured to generate and transmit baseband communications circuitry data request 320 to baseband communications circuitry 122 in order to receive baseband communications circuitry data 318, such that movement module 340 may utilize baseband communications circuitry data 318 alone or in conjunction with any available motion data 302 and/or any available short range communications circuitry data 306 and/or any available satellite navigation communications circuitry data 310 and/or any available WLAN communications circuitry data 314 to more reliably determine the current movement state of device 100.

A power management state or mode of movement management system 301 (e.g., of movement module 340) and/or of any application processor and/or of baseband communications circuitry 122 may be operative to determine when baseband communications circuitry data 318 may be provided to movement module 340. For example, when movement module 340 is in an idle, sleep, hibernation, or any other suitable lower power mode, baseband communications circuitry 122 may be configured to provide baseband communications circuitry data 318 to movement module 340 when it is determined that such baseband communications circuitry data 318 may be indicative of a probable movement state change (e.g., data indicative of a new location or a new speed of device 100). Alternatively, when movement module 340 is in an active or any other suitable higher power mode, movement module 340 may be configured to generate and transmit baseband communications circuitry data request 320 to baseband communications circuitry 122 in order to receive baseband communications circuitry data 318 at various suitable times, such as at any detected movement state change (e.g., based on new motion data 302 and/or based on new short range communications circuitry data 306 and/or based on new satellite navigation communications circuitry data 310 and/or based on new WLAN communications circuitry data 314) and/or at specific time intervals (e.g., at every suitable epoch (e.g., 2.56 seconds)).

Although not shown in FIG. 3, any suitable processing circuitry, such as AP 102', that may be distinct from communications circuitry 122 and movement module 340 may be utilized (e.g., with or without data 311 from database 104') in order to access such information from communications circuitry 122 (e.g., as discussed above with respect to one or more of communications circuitry 116, 118, and 120). Alternatively, in some embodiments, as mentioned, baseband communications circuitry data 318 may be accessed by movement module 340 directly from communications circuitry 122 without the need for any intermediate processing circuitry. Baseband communications circuitry data 318 may be indicative of an estimated speed and/or location of device 100 at one or more previous moments in time based on the timestamps of any unique base station identifiers and signal strengths detected for use in determining the estimated speed and/or location. The age of such timestamps and/or the time difference between two or more timestamps and/or any other suitable characteristic(s) of the baseband data used to estimate one or more speeds and/or locations of device 100 may also be used by movement module 340 when determining a movement state of device 100.

Movement module 340 may also be configured to use various other types of data that may be accessible to device 100, in addition to motion data 302 and/or in addition to data from one or more of communications circuitries 116, 118, 120, and 122, in order to determine the current movement state of device 100. For example, although not shown herein, but as described in co-pending and commonly assigned U.S. Patent Application Publication No. 2015-0065107, movement module 340 may also be configured to receive pass data from any suitable pass application of device 100 (e.g., Passbook by Apple Inc., Google Wallet by Google Inc. of Mountain View, Calif., etc.) that may be accessible to device 100 for storing and utilizing various types of passes (e.g., transportation boarding passes, event tickets, coupons, store cards, mobile payment cards, etc.) and/or calendar data from a calendar application of device 100 (e.g., Calendar by Apple Inc. or Outlook™ by Microsoft Corporation of Redmond, Wash.) that may be accessible to device 100 for storing and detecting various temporal calendar events (e.g., meetings, parties, conference calls, etc.).

Movement module 340 may be configured to prioritize or rank various data sources (e.g., motion sensor circuitry 112, short range communications circuitry 116, satellite navigation communications circuitry 118, WLAN communications circuitry 120, baseband circuitry 122, etc.) with respect to one another based on various factors, including degree of confidence in the accuracy of the data from one, some, or each available source, power consumption associated with collecting the data from one, some, or each source, the specific type of data received at a specific moment in time from one, some, or each source, and the like. In some embodiments, movement module 340 may only request or analyze non-motion sensor data (e.g., data from one or more of short range communications circuitry 116 (e.g., via data request 308), satellite navigation communications circuitry 118 (e.g., via data request 312), WLAN communications circuitry 120 (e.g., via data request 316), and/or baseband circuitry 122 (e.g., via data request 320)) when a potential movement state change is detected based on motion data 302. In such embodiments. the requested non-motion sensor data may bolster or hinder confidence in the detected potential movement state change and help movement module 340 determine whether or not to determine that a movement state change has occurred. Additionally or alternatively, in some embodiments, movement module 340 may only request or analyze data from one or more of satellite navigation communications circuitry 118 (e.g., via data request 312), WLAN communications circuitry 120 (e.g., via data request 316), and/or baseband circuitry 122 (e.g., via data request 320) when no pertinent movement state data is detected based on short range communications circuitry data 306 (e.g., when no reliable vehicle speed information or vehicle environment device location information is detected based on data 306). Additionally or alternatively, in some embodiments, movement module 340 may only request or analyze data from one or more of WLAN communications circuitry 120 (e.g., via data request 316) and/or baseband circuitry 122 (e.g., via data request 320) when no pertinent movement state data is detected based on short range communications circuitry data 306 (e.g., when no reliable vehicle speed information or vehicle environment device location information is detected based on data 306) and when no pertinent or reliable movement state data is detected based on satellite navigation communications circuitry data 310 (e.g., when no reliable device speed and/or location information is detected based on data 310). Additionally or alternatively, in some embodiments, movement module 340 may only request or analyze data from baseband circuitry 122 (e.g., via data request 320) when no pertinent movement state data is detected based on short range communications circuitry data 306 (e.g., when no reliable vehicle speed information or vehicle environment device location information is detected based on data 306) and when no pertinent or reliable movement state data is detected based on satellite navigation communications circuitry data 310 (e.g., when no reliable device speed and/or location information is detected based on data 310) and when no pertinent or reliable movement state data is detected based on WLAN communications circuitry data 314 (e.g., when no reliable device speed and/or location information is detected based on data 314). Therefore, in some embodiments, while motion sensor circuitry data 302 may be utilized by movement module 340 at most or all times for determining reliable movement state data, movement module 340 may prioritize the use of short range communications circuitry data 306 over satellite navigation communications circuitry data 310 for at least certain situations, and/or may prioritize the use of satellite navigation communications circuitry data 310 over WLAN communications circuitry data 314 for at least certain situations, and/or may prioritize the use of WLAN communications circuitry data 314 over baseband communications circuitry data 318 for at least certain situations.

While motion sensor circuitry data 302 may be made available to movement module 340 at most or all times (e.g., motion sensor circuitry 112 may be configured to be always on), certain other data sources may be configured to be asleep or turned off in many instances. For example, while short range communications circuitry data 306 may often be more effective and/or reliable and/or efficient than satellite navigation communications circuitry data 310 and/or WLAN communications circuitry data 314 and/or baseband communications circuitry data 318, at least for confidently determining an in-vehicle (e.g., driving) movement state condition, short range communications circuitry 116 (and/or any related AP 102') may often be powered down or not activated to save power resources of device 100 or not communicatively coupled to any remote entity, such that short range communications circuitry data 306 may often not be available to movement module 340 and such that other communications circuitry data sources (e.g., satellite navigation communications circuitry 118, WLAN communications circuitry 120, and/or baseband communications circuitry 122) may instead need to be relied on by movement module 340. As another example, while satellite navigation communications circuitry data 310 may often be more effective and/or reliable and/or efficient than WLAN communications circuitry data 314 and/or baseband communications circuitry data 318, at least for confidently determining an in-vehicle (e.g., driving) movement state condition, satellite navigation communications circuitry 118 (and/or any related AP 102') may often be powered down or not activated to save power resources of device 100 or not communicatively coupled to any remote entity, such that satellite navigation communications circuitry data 310 may often not be available to movement module 340 and such that other communications circuitry data sources (e.g., WLAN communications circuitry 120 and/or baseband communications circuitry 122) may instead need to be relied on by movement module 340. As yet another example, while WLAN communications circuitry data 314 may often be more effective and/or reliable and/or efficient than baseband communications circuitry data 318, at least for confidently determining an in-vehicle (e.g., driving) movement state condition, WLAN communications circuitry 120 (and/or any related AP 102') may be powered down or not activated to save power resources of device 100 or not communicatively coupled to any remote entity, such that WLAN communications circuitry data 314 may often not be available to movement module 340 and such that other communications circuitry data sources (e.g., baseband communications circuitry 122) may instead need to be relied on by movement module 340. Baseband communications circuitry 122 may be configured to generate baseband communications circuitry data 318 indicative of a speed and/or location of device 100 without relying on any independent functionality of an often asleep AP 102', such that movement module 340 may be continuously provided with helpful movement state information from baseband communications circuitry 122 even if any AP 102' may be asleep and/or no data from each one of communications circuitry 116, 118, and 120 may be available.

Once movement module 340 has determined a current movement state of device 100 (e.g., based on one or more of data 302, 306, 310, 314, 318, and/or any other suitable data accessible by device 100), movement module 340 may be configured to generate and transmit movement state data 322 to management module 380, where movement state data 322 may be indicative of the determined movement state of device 100 (e.g., stationary, walking, running, cycling, in-vehicle operation (e.g., driving), etc.). In some embodiments, movement module 340 may be configured to generate appropriate movement state data 322 at least based on the most recently received motion data 302 from motion sensor circuitry 112 as well as any amount of previously received motion data 302 from motion sensor circuitry 112, which may help enable movement module 340 to determine whether device 100 has just changed movement states or is maintaining a current movement state (e.g., whether device 100 has changed from a stationary movement state to any in motion movement state, whether device 100 has changed from an in motion movement state to a stationary movement state, whether device 100 has maintained a stationary movement state, or whether device 100 has maintained an in motion movement state). As just one example, when received motion data 302 is detected to be constantly transitioning between a classified stationary motion state and a classified running motion state, movement module 340 may choose to access or otherwise at least partially rely on other sources of data (e.g., data 306 and/or data 310 and/or data 314 and/or data 318), which may provide movement module 340 with additional data to help determine whether the movement state of device 100 should remain as one of in motion or stationary despite these detected transitions from motion data 302. In response to relying on such additional data, movement module 340 may be configured to more reliably provide movement state data 322.

The movement state defined by movement state data 322 may be determined using any suitable combination of data available to movement module 340. For example, if any available short range communications circuitry data 306 is indicative of device 100 being communicatively coupled to a vehicle computer and/or indicative of a non-stationary speed of a communicatively coupled vehicle, then movement module 340 may be configured to disregard any other data and generate movement state data 322 that identifies a "driving" (e.g., in-vehicle) movement state.

Additionally or alternatively, if such short range communications circuitry data 306 is not available, movement module 340 may be configured to determine if any available satellite navigation communications circuitry data 310 is indicative of device 100 currently having an instantaneous speed above a first satellite navigation threshold speed (e.g., 30 miles per hour, 40 miles per hour, 50 miles per hour, or the like) and, if so, disregard any other data and generate movement state data 322 that identifies a "driving" (e.g., in-vehicle) movement state. Additionally or alternatively, if such short range communications circuitry data 306 is not available, movement module 340 may be configured to determine not only (i) if any available satellite navigation communications circuitry data 310 is indicative not only of (ia) device 100 not having an instantaneous speed above the first satellite navigation threshold speed but also of (ib) device having an average speed (e.g., over the last 4 epochs (e.g., 10 seconds)) above a second satellite navigation threshold (e.g., 10 miles per hour, 15 miles per hour, 20 miles per hour, 25 miles per hour, or the like) and also (ii) if the most recent raw motion call is not for a cycling type of motion class (e.g., the motion class with the highest motion class score for the most recent epoch (e.g., for the most recently received motion data 302) is not a cycling motion class), and, if so, disregard any other data and generate movement state data 322 that identifies a "driving" (e.g., in-vehicle) movement state.

Additionally or alternatively, if such short range communications circuitry data 306 is not available and/or if such satellite navigation communications circuitry data 310 is not available, movement module 340 may be configured to determine not only (i) if any available WLAN communications circuitry data 314 is indicative of device 100 currently having or previously having a speed (e.g., instantaneous speed or average speed) above a WLAN threshold speed (e.g., 10 miles per hour, 15 miles per hour, 20 miles per hour, 25 miles per hour, or the like) but also (ii) if no recent raw motion call was for a pedestrian (e.g., walking or running) type of motion class (e.g., the motion class with the highest motion class score for any recent epoch (e.g., for the received motion data 302) is not a walking or running motion class), and, if so, disregard any other data and generate movement state data 322 that identifies a "driving" (e.g., in-vehicle) movement state. In such an embodiment, the raw motion calls analyzed may be for all raw motion calls within a period of time based on the WLAN communications circuitry data 314 indicative of the speed above the WLAN threshold speed. For example, if the WLAN data 314 indicative of a speed above the WLAN threshold speed is based on WLAN log data with one or more timestamps, the most recent of those timestamps may be used to define the start of the time period (e.g., up until the present) within which no raw motion calls may be a walking or running type motion call in order for movement module 340 to generate movement state data 322 that identifies a "driving" (e.g., in-vehicle) movement state. Therefore, a WLAN data-induced in-vehicle movement state may only be defined if no pedestrian motion state was determined to have the highest motion class score for any epoch during the time between when the WLAN threshold speed was detected and when the movement state is being defined.

Additionally or alternatively, if such short range communications circuitry data 306 is not available and/or if satellite navigation communications circuitry data 310 indicative of speed is not available and/or if WLAN communications circuitry data 314 indicative of speed is not available, movement module 340 may be configured to determine not only (i) if any available baseband communications circuitry data 318 is indicative of device 100 currently having or previously having a speed (e.g., instantaneous speed or average speed over a recent period of time (e.g., the last 30 seconds)) above a baseband threshold speed (e.g., 30 miles per hour, 40 miles per hour, 50 miles per hour, or the like) but also (ii) if no steps have been incremented by the step counter of motion sensor circuitry 112 within a recent period of time (e.g., the last 30 seconds (e.g., the same amount of time within which baseband communications circuitry data 318 indicates an average speed above the baseband threshold speed)), and, if so, disregard any other data and generate movement state data 322 that identifies a "driving" (e.g., in-vehicle) movement state. Additionally or alternatively, if such short range communications circuitry data 306 is not available and/or if satellite navigation communications circuitry data 310 indicative of speed is not available and/or if WLAN communications circuitry data 314 indicative of speed is not available, movement module 340 may be configured to determine not only (i) if any available baseband communications circuitry data 318 is indicative of device 100 currently having or previously having a speed (e.g., instantaneous speed or average speed over a recent period of time (e.g., the last 30 seconds)) above a baseband threshold speed (e.g., 30 miles per hour, 40 miles per hour, 50 miles per hour, or the like) but also (ii) if no recent raw motion call was for a pedestrian (e.g., walking or running) type of motion class (e.g., the motion class with the highest motion class score for any recent epoch (e.g., for the received motion data 302) is not a walking or running motion class), and, if so, disregard any other data and generate movement state data 322 that identifies a "driving" (e.g., in-vehicle) movement state. In such an embodiment, the raw motion calls analyzed may be for all raw motion calls within a period of time based on the baseband communications circuitry data 318 indicative of the speed above the baseband threshold speed. For example, if the baseband data 318 indicative of a speed above the baseband threshold speed is based on baseband data over the last 30 seconds, then that time frame may also be used to define the time frame within which no raw motion calls may be a walking or running type motion call in order for movement module 340 to generate movement state data 322 that identifies a "driving" (e.g., in-vehicle) movement state. Therefore, a baseband data-induced in-vehicle movement state may only be defined if no pedestrian motion state was determined to have the highest motion class score for any epoch during the time frame within which the baseband threshold speed was detected and when the movement state is being defined and/or if no steps were counted for any epoch during the time frame within which the baseband threshold speed was detected and when the movement state is being defined.

Therefore, motion class scores and/or raw motion calls generated for motion data 302 detected by motion sensor circuitry 112 may be relied upon to condition the use of any speed determinations made by satellite navigation communications circuitry data 310 and/or by WLAN communications circuitry data 314 and/or by baseband communications circuitry data 318. In some embodiments, when a speed determination is made by one type of communications circuitry data, another type of communications circuitry data may be requested by movement module 340 to bolster confidence in that speed determination. For example, if, at a certain epoch, movement module 340 receives baseband communications circuitry data 318 indicative of a speed above a baseband speed threshold but no satellite navigation communications circuitry data 310, movement module 340 may generate and transmit satellite navigation communications circuitry data request 308 in order to request speed information from satellite navigation communications circuitry 118 (e.g., such a request may trigger satellite navigation communications circuitry 118 and/or AP 102' to turn on or otherwise make satellite navigation communications circuitry data 310 available to movement module 340 in order to bolster confidence in the speed data indicated by the previously received baseband communications circuitry data 318 from baseband communications circuitry 122 (e.g., a less trusted speed source than satellite navigation communications circuitry 118). As another example, if, at a certain epoch, movement module 340 receives baseband communications circuitry data 318 indicative of a speed above a baseband speed threshold but no WLAN communications circuitry data 314, movement module 340 may generate and transmit WLAN communications circuitry data request 312 in order to request speed information from WLAN communications circuitry 120 (e.g., such a request may trigger WLAN communications circuitry 120 and/or AP 102' to turn on or otherwise make WLAN communications circuitry data 314 available to movement module 340 in order to bolster confidence in the speed data indicated by the previously received baseband communications circuitry data 318 from baseband communications circuitry 122 (e.g., a less trusted speed source than WLAN communications circuitry 120). As another example, if, at a certain epoch, movement module 340 receives WLAN communications circuitry data 314 indicative of a speed above a WLAN speed threshold but no satellite navigation communications circuitry data 310, movement module 340 may generate and transmit satellite navigation communications circuitry data request 308 in order to request speed information from satellite navigation communications circuitry 118 (e.g., such a request may trigger satellite navigation communications circuitry 118 and/or AP 102' to turn on or otherwise make satellite navigation communications circuitry data 310 available to movement module 340 in order to bolster confidence in the speed data indicated by the previously received WLAN communications circuitry data 314 from WLAN communications circuitry 120 (e.g., a less trusted speed source than satellite navigation communications circuitry 118).

In response to determining the current movement state of device 100 by receiving movement state data 322, management module 380 may be configured to apply at least one movement-based mode of operation to at least one managed element 124 of device 100 based on the determined current movement state. For example, as shown in FIG. 3, movement management system 301 may include management module 380, which may be configured to receive movement state data 322 from movement module 340, as well as to generate and share movement mode data 324 with at least one managed element 124 of device 100 at least partially based on the received movement state data 322, where such movement mode data 324 may be received by managed element 124 for controlling at least one characteristic of managed element 124. Managed element 124 may be any suitable component and/or any suitable application of device 100 (e.g., any processor 102 or 102', any input component 108, any output component 110, any user interface application, and/or the like), and movement mode data 324 may control managed element 124 in any suitable way, such as by enhancing, enabling, disabling, restricting, and/or limiting one or more certain functionalities associated with such an application or component of device 100. As just one particular example, a do-not-disturb driver ("DND") mode may be enabled by management module 380 when movement state data 322 is indicative of an in-vehicle (e.g., driving) movement state. While such a mode is enabled, the mode may be operative to suppress or mute or prevent any notification (e.g., audible, tactile, and/or visual via any device output component) to a user of device 100 for any communications (e.g., text messages, telephone calls, etc.) received by device 100 or any other events that may otherwise result in a notification being provided by device 100, which may increase the ability of the user to focus on driving. Management module 380 may be configured to generate appropriate movement mode data 324 for an appropriate managed element 124 based on received movement state data 322 from movement module 340 as well as based on any other suitable data available to device 100, such as current location data indicative of the current location of device 100 (e.g., GPS information from communications circuitry 118), current power capacity of device 100 (e.g., of power supply 106), and the like.

In some embodiments, a mode enabled by management module 380 when movement state data 322 is indicative of an in-vehicle (e.g., driving) movement state (e.g., a DND mode) may be initiated in response to a new communication from a remote source being received by device 100. For example, while a WLAN log is being populated despite at least a portion of WLAN communications circuitry 120 and/or AP 102' being asleep, which may prevent any speed-indicative WLAN data 314 from being received by movement module 340, a DND mode may not be enabled, such that a remote communication received by device 100 would normally result in a notification being delivered to a user of device 100. During such a circumstance, if a remote communication (e.g., a text message or telephone call) is received by baseband communications circuitry 122, baseband communications circuitry 122 may be configured to generate and communicate a communication received alert 313 to AP 102', which may cause AP 102' to wake up and process alert 313 for the purpose of alerting a user of device 100 about the received communication. However, in response to being woken up by alert 313, AP 102' may also be configured to automatically request (e.g., with request 316') and/or automatically receive all available WLAN log data 314' from WLAN communications circuitry 120. Such WLAN log data 314' may be processed by AP 102' and communicated to movement module 340 as speed indicative WLAN communications circuitry data 314, and such speed indicative WLAN communications circuitry data 314 may be processed by movement module 340 to (if appropriate) generate movement state data 322 that is indicative of an in-vehicle (e.g., driving) movement state (e.g., if the speed indicated by that WLAN data is appropriate for determining an in-vehicle movement state), and then such movement state data 322 indicative of an in-vehicle (e.g., driving) movement state may be processed by management module 380 to generate appropriate movement mode data 324 for an appropriate managed element 124 to enable a DND mode. In such embodiments, device 100 may be configured such that device 100 may be operative to enable that DND mode as a result of AP 102' receiving alert 313 before AP 102' may process alert 313 and generate a user notification for presentation to a user via an I/O component 109. That is, in response to being woken up by alert 313, AP 102' may not only enable speed indicative WLAN data 314 to be provided to movement management system 301 for enabling a DND mode, but AP 102' may also process alert 313 for generating an appropriate user notification. However, any user notification that may be generated based on alert 313 may be suppressed by a DND mode that is enabled prior to such user notification being presented to a user. Alternatively or additionally, device 100 may be configured to handle a somewhat opposite circumstance, in which alert 313 may be received while a DND mode is already enabled and any speed indicative WLAN data 314 may be used by system 301 to disable the DND mode so that any user notification for the recently received communication may be timely presented to a user of device 100. In some embodiments (e.g., if a DND mode is not currently enabled), AP 102' may be configured to periodically wake up and provide new WLAN data 314 to system 301 (e.g., for the purpose of potentially enabling the DND mode or determining a new movement state).

A DND mode or any other suitable mode that may be enabled by a determined in-vehicle (e.g., driving) movement state may be disabled (e.g., a driving movement state may be changed to a non-driving movement state) when any suitable event is detected. For example, in some embodiments, a non-vehicle movement state may be determined by movement module 340 if (i) a raw motion call identifies a walking motion class or (ii) a raw motion call identifies a running motion class or (iii) the step counter is incrementing and a raw motion call is neither a driving motion class nor a cycling with device attached to chassis motion class or (iv) a static exit event is detected or (v) a semi-static exit event is detected or (vi) a learned location event is detected. A static exit event may be detected when (i) each raw motion call over a particular period of time (e.g., 48 epochs) identifies a stationary motion class or (ii) no motion is detected over a particular period of time (e.g., 48 epochs) and a device pose of device 100 has been detected to have changed in another particular period of time prior to the particular period of time in which each raw motion call identified a stationary motion class or in which no motion was detected, where a device pose may be substantially consistent gravity vector associated with the device and a device pose change is a substantial change in such a gravity vector (e.g., by at least 20°, or 25°, or 30°, or the like). Therefore, for example, a static exit event may be detected when motion data 302 is indicative of (i) device 100 not moving over the last 2 minutes and of (ii) device 100 being moved from a first device pose (e.g., being held upright (e.g., in a cell phone holder on a dashboard of a vehicle)) to a second device pose (e.g., being held flat in a purse of a user) within a 2 minute period prior to the 2 minutes during which the device was determined to be not moving. A semi-static exit event may be detected when another likelihood accumulation buffer score is determined to be less than a particular threshold. For example, motion sensor circuitry 112 or movement module 340 may manage another likelihood accumulation buffer (e.g., an "exit likelihood accumulation buffer") that may be operative to generate a score determinative of an exit event for exiting an in-vehicle movement state. For example, at each periodic interval (e.g., epoch) such an exit likelihood accumulation buffer may be operative to calculate the sum of the likelihood motion class score for each driving type of motion class (e.g., the sum of the likelihood motion class score for driving with device stowed and the likelihood motion class score for driving with device on user) for each of any number of most recently generated likelihood scores less two times the likelihood score for the stationary (e.g., unknown motion or semi-stationary state or the like) motion class for each of that number of most recently generated likelihood scores, and then compare that result to a particular threshold value, and then, if the result is less than the particular threshold value, then movement module 340 may make a determination to change from an in-vehicle (e.g., driving) movement state and/or an enabled DND mode may be disabled. For example, at every epoch, in addition to determining the likelihood motion class score for each motion class, device 100 may also be operative to determine whether or not a particular threshold value is greater than the result (e.g., exit likelihood accumulation buffer score) of the sum of all driving type motion class scores from the last 24 epochs (e.g., over the last minute) less double the sum of the stationary motion class scores from the last 24 epochs. In such an example, at every epoch, the driving and stationary motion class scores from 25 epochs ago may be discarded from the buffer and the driving and stationary motion class scores from the most recent epoch may be added to the buffer so that a new exit likelihood accumulation buffer score may be calculated and compared to the threshold value. In some embodiments, the likelihood motion class scores in the exit likelihood accumulation buffer may not be updated for a particular epoch if a particular event was detected during that epoch, such as a touch event or haptic event or audio output event. This may prevent certain events that are known to vibrate device 100 from affecting the exit likelihood accumulation buffer score. A learned location event may be detected whenever it is determined that WLAN communications circuitry 120 is communicatively coupled for at least a particular period of time to a particular WAP (e.g., a home Wi-Fi network) or whenever it is determined that device 100 is located at a frequently visited location (e.g., a user's home or office).

Figure 4:
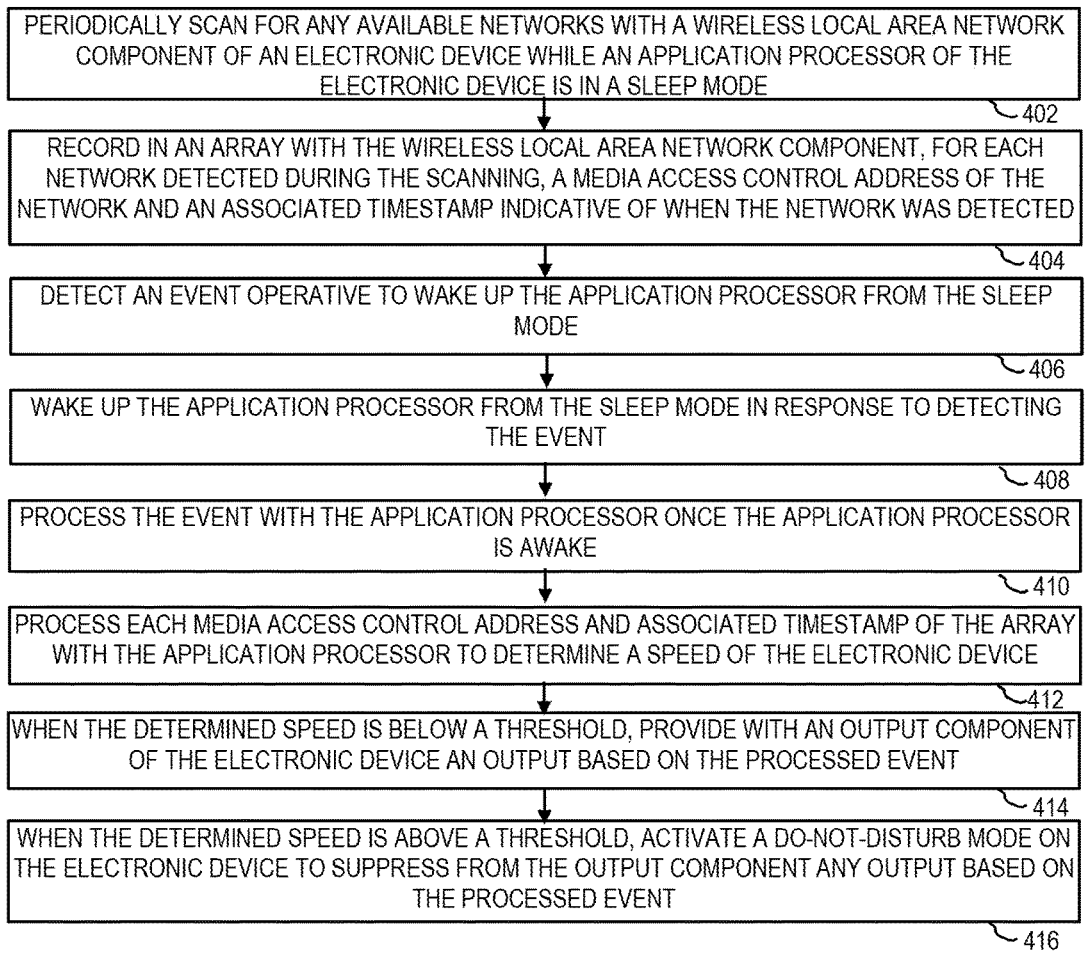

FIG. 4 is a flowchart of an illustrative process 400 for managing a do-not-disturb mode on an electronic device that includes a wireless local area network component, an application processor, and an output component. At operation 402 of process 400, while the application processor is in a sleep mode, the wireless local area network component may periodically scan for any available networks. At operation 404 of process 400, the wireless local area network component may record in an array, for each network detected during the scanning of operation 402, a media access control address of the network and an associated timestamp indicative of when the network was detected. At operation 406 of process 400, the electronic device may detect an event operative to wake up the application processor from the sleep mode. At operation 408 of process 400, in response to the detecting of operation 406, the electronic device may wake up the application processor from the sleep mode. At operation 410 of process 400, after the waking up of operation 408, the application processor may process the event. At operation 412 of process 400, after the waking up of operation 408, the application processor may process each media access control address and associated timestamp of the array to determine a speed of the electronic device. At operation 414 of process 400, when the determined speed is below a threshold, an output component of the electronic device may provide an output based on the processed event. At operation 416 of process 400, when the determined speed is above a threshold, the do-not-disturb mode may be activated on the electronic device to suppress from the output component any output based on the processed event.

It is understood that the operations shown in process 400 of FIG. 4 are only illustrative and that existing operations may be modified or omitted, additional operations may be added, and the order of certain operations may be altered.

FIG. 5 is a flowchart of an illustrative process 500 for managing a do-not-disturb mode on an electronic device that includes motion sensor circuitry, short range communications circuitry, satellite navigation communications circuitry, wireless local area network ("WLAN") communications circuitry, and baseband communications circuitry. At operation 502 of process 500, the electronic device may determine the availability of any new data from each one of the motion sensor circuitry, the short range communications circuitry, the satellite navigation communications circuitry, the WLAN communications circuitry, and the baseband communications circuitry. At operation 504 of process 500, the electronic device may activate the do-not-disturb mode on the electronic device when any one of the following is true: new short range data is determined to be available from the short range communications circuitry that is indicative of the electronic device being communicatively coupled to a computer of a vehicle, new satellite navigation data is determined to be available from the satellite navigation communications circuitry that is indicative of the electronic device moving faster than a first speed threshold and no new motion sensor data is determined to be available from the motion sensor circuitry that is indicative of any pedestrian motion class and no new short range data is determined to be available from the short range communications circuitry that is indicative of the electronic device being communicatively coupled to a computer of a vehicle, new satellite navigation data is determined to be available from the satellite navigation communications circuitry that is indicative of the electronic device moving faster than a second speed threshold and no new motion sensor data is determined to be available from the motion sensor circuitry that is indicative of any cycling motion class or any pedestrian motion class and no new short range data is determined to be available from the short range communications circuitry that is indicative of the electronic device being communicatively coupled to a computer of a vehicle, new WLAN data is determined to be available from the WLAN communications circuitry that is indicative of the electronic device moving faster than a third speed threshold and no new motion sensor data is determined to be available from the motion sensor circuitry that is indicative of any pedestrian motion class within a period of time associated with the new WLAN data and no new short range data is determined to be available from the short range communications circuitry that is indicative of the electronic device being communicatively coupled to a computer of a vehicle and no new satellite navigation data is determined to be available from the satellite navigation communications circuitry, new baseband data is determined to be available from the baseband communications circuitry that is indicative of the electronic device moving faster than a fourth speed threshold and no new motion sensor data is determined to be available from the motion sensor circuitry that is indicative of any pedestrian motion class within a period of time associated with the new baseband data and no new short range data is determined to be available from the short range communications circuitry that is indicative of the electronic device being communicatively coupled to a computer of a vehicle and no new satellite navigation data is determined to be available from the satellite navigation communications circuitry and no new WLAN data is determined to be available from the WLAN communications circuitry, and new motion sensor data is determined to be available from the motion sensor circuitry that is indicative of a vehicular driving motion class and no new short range data is determined to be available from the short range communications circuitry that is indicative of the device being communicatively coupled to a computer of a vehicle and no new satellite navigation data is determined to be available from the satellite navigation communications circuitry and no new WLAN data is determined to be available from the WLAN communications circuitry and no new baseband data is determined to be available from the baseband communications circuitry.

It is understood that the operations shown in process 500 of FIG. 5 are only illustrative and that existing operations may be modified or omitted, additional operations may be added, and the order of certain operations may be altered.

Figure 6:
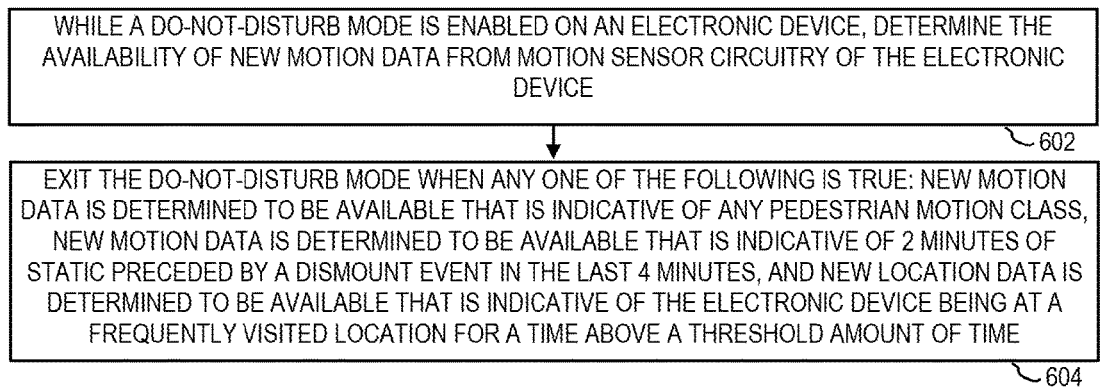

FIG. 6 is a flowchart of an illustrative process 600 for managing a do-not-disturb ("DND") mode on an electronic device. At operation 602 of process 600, while the DND mode is enabled, the electronic device may determine the availability of new motion data from motion sensor circuitry of the electronic device. At operation 604 of process 600, the electronic device may exit the DND mode when any one of the following is true: new motion data is determined to be available that is indicative of any pedestrian motion class, new motion data is determined to be available that is indicative of 2 minutes of static preceded by a dismount event in the last 4 minutes, and new location data is determined to be available that is indicative of the electronic device being at a frequently visited location for a time above a threshold amount of time.

It is understood that the operations shown in process 600 of FIG. 6 are only illustrative and that existing operations may be modified or omitted, additional operations may be added, and the order of certain operations may be altered.

Moreover, one, some, or all of the processes described with respect to FIGS. 1-6 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of such a non-transitory computer-readable medium (e.g., memory 104 of FIG. 1) may include, but are not limited to, read-only memory, random-access memory, flash memory, CD-ROMs, DVDs, magnetic tape, removable memory cards, optical data storage devices, and the like. The computer-readable medium can also be distributed over network-coupled computer systems so that the computer-readable code is stored and executed in a distributed fashion. For example, the computer-readable medium may be communicated from one electronic device to another electronic device using any suitable communications protocol (e.g., the computer-readable medium may be communicated to electronic device 100 via any suitable communications circuitry 114 (e.g., as at least a portion of application 103)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of movement management system 301 may be provided as a software construct, firmware construct, one or more hardware components, or a combination thereof. For example, any or each module of movement management system 301 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of movement management system 301 are only illustrative, and that the number, configuration, functionality, and interconnection of existing modules may be modified or omitted, additional modules may be added, and the interconnection of certain modules may be altered.

At least a portion of one or more of the modules of movement management system 301 may be stored in or otherwise accessible to device 100 in any suitable manner (e.g., in memory 104 of device 100 (e.g., as at least a portion of application 103)). Any or each module of movement management system 301 may be implemented using any suitable technologies (e.g., as one or more integrated circuit devices), and different modules may or may not be identical in structure, capabilities, and operation. Any or all of the modules or other components of movement management system 301 may be mounted on an expansion card, mounted directly on a system motherboard, or integrated into a system chipset component (e.g., into a "north bridge" chip).

Any or each module of movement management system 301 may be a dedicated system implemented using one or more expansion cards adapted for various bus standards. For example, all of the modules may be mounted on different interconnected expansion cards or all of the modules may be mounted on one expansion card. With respect to movement management system 301, by way of example only, the modules of movement management system 301 may interface with a motherboard or processor 102 of device 100 through an expansion slot (e.g., a peripheral component interconnect ("PCI") slot or a PCI express slot). Alternatively, movement management system 301 need not be removable but may include one or more dedicated modules that may include memory (e.g., RAM) dedicated to the utilization of the module. In other embodiments, movement management system 301 may be at least partially integrated into device 100. For example, a module of movement management system 301 may utilize a portion of device memory 104 of device 100. Any or each module of movement management system 301 may include its own processing circuitry and/or memory. Alternatively, any or each module of movement management system 301 may share processing circuitry and/or memory with any other module of movement management system 301 and/or processor 102 and/or memory 104 of device 100.

As described above, one aspect of the present technology is the gathering and use of data available from various sources to improve the determination of movement states of an electronic device. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, office addresses, data or records relating to a user's health or level of fitness (e.g., vital signs measurements, medication information, exercise information, etc.), date of birth, or any other identifying or personal information.

The present disclosure recognizes that the use of such personal information data, in the present technology, can be used to the benefit of users. For example, the personal information data can be used to improve the determination of movement states of an electronic device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location detection services, the present technology can be configured to allow users to select to "opt in" or "opt out" of participation in the collection of personal information data during registration for services or anytime thereafter. In addition to providing "opt in" or "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the determination of movement states of an electronic device can be made based on non-personal information data or a bare minimum amount of personal information, such as the content being requested by the device associated with a user, other non-personal information available to the device, or publicly available information.

While there have been described systems, methods, and computer-readable media for managing movement states of an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for managing a do-not-disturb mode on an electronic device that comprises a wireless local area network component, an application processor, and an output component, the method comprising:
    while the application processor is in a sleep mode:
        periodically scanning for any available networks with the wireless local area network component;
        recording in an array with the wireless local area network component, for each network detected during the scanning, a media access control address of the network and an associated timestamp indicative of when the network was detected; and
        detecting an event operative to wake up the application processor from the sleep mode;
    in response to the detecting, waking up the application processor from the sleep mode; and
    after the waking up:
        processing the event with the application processor;
        processing each media access control address and associated timestamp of the array with the application processor to determine a speed of the electronic device;
        when the determined speed is below a threshold, providing with the output component an output based on the processed event; and
        when the determined speed is above a threshold, activating the do-not-disturb mode on the electronic device to suppress from the output component any output based on the processed event.

2. The method of claim 1, wherein the threshold is based on a speed value associated with a driving vehicle.

3. The method of claim 1, wherein the event comprises the electronic device receiving a text message communication.

4. The method of claim 1, wherein the event comprises the electronic device receiving a telephone call.

5. The method of claim 1, wherein the processing each media access control address and associated timestamp of the array with the application processor to determine a speed of the electronic device comprises:
    for each one of at least two of the timestamps, determining a location of the electronic device at the time of the timestamp using the media access control address associated with the timestamp; and
    determining the speed of the electronic device using the determined locations.

6. A method of managing a do-not-disturb mode on an electronic device that comprises motion sensor circuitry, short range communications circuitry, satellite navigation communications circuitry, wireless local area network ("WLAN") communications circuitry, and baseband communications circuitry, wherein the method comprises:
    determining the availability of any new data from each one of the motion sensor circuitry, the short range communications circuitry, the satellite navigation communications circuitry, the WLAN communications circuitry, and the baseband communications circuitry; and
    activating the do-not-disturb mode on the electronic device when any one of the following is true:
        new short range data is determined to be available from the short range communications circuitry that is indicative of the electronic device being communicatively coupled to a computer of a vehicle;
        new satellite navigation data is determined to be available from the satellite navigation communications circuitry that is indicative of the electronic device moving faster than a first speed threshold and no new motion sensor data is determined to be available from the motion sensor circuitry that is indicative of any pedestrian motion class and no new short range data is determined to be available from the short range communications circuitry that is indicative of the electronic device being communicatively coupled to a computer of a vehicle;
        new satellite navigation data is determined to be available from the satellite navigation communications circuitry that is indicative of the electronic device moving faster than a second speed threshold and no new motion sensor data is determined to be available from the motion sensor circuitry that is indicative of any cycling motion class or any pedestrian motion class and no new short range data is determined to be available from the short range communications circuitry that is indicative of the electronic device being communicatively coupled to a computer of a vehicle;
        new WLAN data is determined to be available from the WLAN communications circuitry that is indicative of the electronic device moving faster than a third speed threshold and no new motion sensor data is determined to be available from the motion sensor circuitry that is indicative of any pedestrian motion class within a period of time associated with the new WLAN data and no new short range data is determined to be available from the short range communications circuitry that is indicative of the electronic device being communicatively coupled to a computer of a vehicle and no new satellite navigation data is determined to be available from the satellite navigation communications circuitry;

new baseband data is determined to be available from the baseband communications circuitry that is indicative of the electronic device moving faster than a fourth speed threshold and no new motion sensor data is determined to be available from the motion sensor circuitry that is indicative of any pedestrian motion class within a period of time associated with the new baseband data and no new short range data is determined to be available from the short range communications circuitry that is indicative of the electronic device being communicatively coupled to a computer of a vehicle and no new satellite navigation data is determined to be available from the satellite navigation communications circuitry and no new WLAN data is determined to be available from the WLAN communications circuitry; and new motion sensor data is determined to be available from the motion sensor circuitry that is indicative of a vehicular driving motion class and no new short range data is determined to be available from the short range communications circuitry that is indicative of the device being communicatively coupled to a computer of a vehicle and no new satellite navigation data is determined to be available from the satellite navigation communications circuitry and no new WLAN data is determined to be available from the WLAN communications circuitry and no new baseband data is determined to be available from the baseband communications circuitry.

7. The method of claim 6, wherein the activating the do-not-disturb mode on the electronic device comprises activating the do-not-disturb mode on the electronic device when new short range data is determined to be available from the short range communications circuitry that is indicative of the electronic device being communicatively coupled to a computer of a vehicle.

8. The method of claim 6, wherein the activating the do-not-disturb mode on the electronic device comprises activating the do-not-disturb mode on the electronic device when new satellite navigation data is determined to be available from the satellite navigation communications circuitry that is indicative of the electronic device moving faster than a first speed threshold and no new motion sensor data is determined to be available from the motion sensor circuitry that is indicative of any pedestrian motion class and no new short range data is determined to be available from the short range communications circuitry that is indicative of the electronic device being communicatively coupled to a computer of a vehicle.

9. The method of claim 6, wherein the activating the do-not-disturb mode on the electronic device comprises activating the do-not-disturb mode on the electronic device when new satellite navigation data is determined to be available from the satellite navigation communications circuitry that is indicative of the electronic device moving faster than a second speed threshold and no new motion sensor data is determined to be available from the motion sensor circuitry that is indicative of any cycling motion class or any pedestrian motion class and no new short range data is determined to be available from the short range communications circuitry that is indicative of the electronic device being communicatively coupled to a computer of a vehicle.

10. The method of claim 6, wherein the activating the do-not-disturb mode on the electronic device comprises activating the do-not-disturb mode on the electronic device when new WLAN data is determined to be available from the WLAN communications circuitry that is indicative of the electronic device moving faster than a third speed threshold and no new motion sensor data is determined to be available from the motion sensor circuitry that is indicative of any pedestrian motion class within a period of time associated with the new WLAN data and no new short range data is determined to be available from the short range communications circuitry that is indicative of the electronic device being communicatively coupled to a computer of a vehicle and no new satellite navigation data is determined to be available from the satellite navigation communications circuitry.

11. The method of claim 6, wherein the activating the do-not-disturb mode on the electronic device comprises activating the do-not-disturb mode on the electronic device when new baseband data is determined to be available from the baseband communications circuitry that is indicative of the electronic device moving faster than a fourth speed threshold and no new motion sensor data is determined to be available from the motion sensor circuitry that is indicative of any pedestrian motion class within a period of time associated with the new baseband data and no new short range data is determined to be available from the short range communications circuitry that is indicative of the electronic device being communicatively coupled to a computer of a vehicle and no new satellite navigation data is determined to be available from the satellite navigation communications circuitry and no new WLAN data is determined to be available from the WLAN communications circuitry.

12. The method of claim 6, wherein the activating the do-not-disturb mode on the electronic device comprises activating the do-not-disturb mode on the electronic device when new motion sensor data is determined to be available from the motion sensor circuitry that is indicative of a vehicular driving motion class and no new short range data is determined to be available from the short range communications circuitry that is indicative of the device being communicatively coupled to a computer of a vehicle and no new satellite navigation data is determined to be available from the satellite navigation communications circuitry and no new WLAN data is determined to be available from the WLAN communications circuitry and no new baseband data is determined to be available from the baseband communications circuitry.

13. The method of claim 6, wherein, when the do-not-disturb mode is activated, the electronic device is operative to mute user notifications for at least one type of event.

14. The method of claim 6, wherein:
the determining the availability of any new data comprises:
determining new motion sensor data is available from the motion sensor circuitry;
determining that a local movement event occurred within a threshold duration of time of the determining the new motion sensor data is available; and
determining that the new motion sensor data is not indicative of a vehicular driving motion class in response to the determining that the local movement event occurred within the threshold duration of time; and
the local movement event comprises one of:
a user input event at an input component of the electronic device;

a haptic output event at a haptic output component of the electronic device; or an audio output event at an audio output component of the electronic device.

15. The method of claim 14, wherein the threshold duration of time is less than 3 seconds.

16. A method of managing a do-not-disturb ("DND") mode on an electronic device comprising:

while the DND mode is enabled, muting user notifications by the electronic device for at least one type of event and determining the availability of new motion data from motion sensor circuitry of the electronic device; and exiting the DND mode and un-muting user notifications by the electronic device for at least one type of event when any one of the following is true:

new motion data is determined to be available that is indicative of 2 minutes of static preceded by a dismount event in the last 4 minutes; or new location data is determined to be available that is indicative of the electronic device being at a frequently visited location for a time above a threshold amount of time.

17. The method of claim 16, wherein the exiting the DND mode further comprises exiting the DND mode when new motion data is determined to be available that is indicative of any pedestrian motion class.

18. The method of claim 16, wherein the exiting the DND mode comprises exiting the DND mode when new motion data is determined to be available that is indicative of 2 minutes of static preceded by a dismount event in the last 4 minutes.

19. The method of claim 16, wherein the exiting the DND mode comprises exiting the DND mode when new location data is determined to be available that is indicative of the electronic device being at a frequently visited location for a time above a threshold amount of time.

20. The method of claim 16, wherein the at least one type of event comprises at least one of the electronic device receiving a text message communication or the electronic device receiving a telephone call.

* * * * *